(12) United States Patent
Akieda et al.

(10) Patent No.: US 7,031,592 B2
(45) Date of Patent: Apr. 18, 2006

(54) INPUT DEVICE

(75) Inventors: Shinichiro Akieda, Shinagawa (JP); Takashi Arita, Shinagawa (JP); Shigemi Kurashima, Shinagawa (JP); Hiroto Inoue, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 174 days.

(21) Appl. No.: 10/735,928

(22) Filed: Dec. 16, 2003

(65) Prior Publication Data
US 2004/0125082 A1    Jul. 1, 2004

(30) Foreign Application Priority Data
Dec. 26, 2002  (JP)  ............................. 2002-377430

(51) Int. Cl.
*G02B 6/00*    (2006.01)
(52) U.S. Cl. ...................... 385/147; 345/156
(58) Field of Classification Search ................ 385/147; 335/156; 345/156
See application file for complete search history.

(56) References Cited
U.S. PATENT DOCUMENTS

| | | | |
|---|---|---|---|
| 5,327,162 A | | 7/1994 | Soma |
| 5,486,965 A | * | 1/1996 | Yoshida et al. ............. 360/265 |
| 5,621,591 A | * | 4/1997 | Rahimi et al. .............. 360/265 |
| 6,816,049 B1 | * | 11/2004 | Watanabe et al. .......... 335/222 |
| 6,831,238 B1 | | 12/2004 | Lau |
| 6,839,050 B1 | * | 1/2005 | Sakamaki et al. .......... 345/156 |
| 6,937,124 B1 | * | 8/2005 | Nakamura et al. ......... 335/222 |
| 2002/0105495 A1 | * | 8/2002 | Numata et al. ............. 345/156 |
| 2004/0125082 A1 | | 7/2004 | Akieda et al. |
| 2004/0178996 A1 | * | 9/2004 | Kurashima et al. ........ 345/173 |

FOREIGN PATENT DOCUMENTS

JP    2000-330688    11/2000

OTHER PUBLICATIONS

U.S. Appl. No. 10/625,727, filed Jul. 24, 2003, Shinichiro Akieda et al., Fujitsu Component Limited.

* cited by examiner

*Primary Examiner*—Ellen E. Kim
(74) *Attorney, Agent, or Firm*—Staas & Halsey LLP

(57) ABSTRACT

An input device includes: magnets that are arranged in a flat state; coils that are arranged so as to face the magnets, and are moved in relation to the magnets; a mobile member that is connected to the coils; a first guide member that slidably guides the mobile member; a second guide member that slidably guides the first guide member in a direction perpendicular to the sliding direction of the mobile member; and a switch that is operated by an operator to carry out an input operation. In this input device, the switch is formed on the mobile member.

32 Claims, 33 Drawing Sheets

RELATIONSHIP BETWEEN POSITION AND THRUST FORCE

Fig. 20A
Fig. 20C
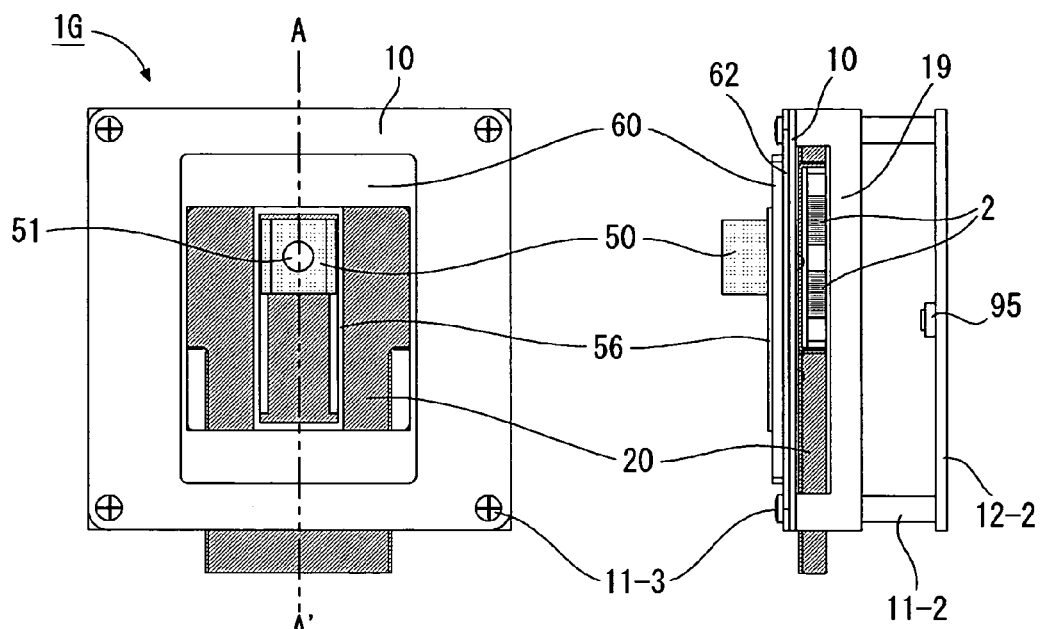
Fig. 20B
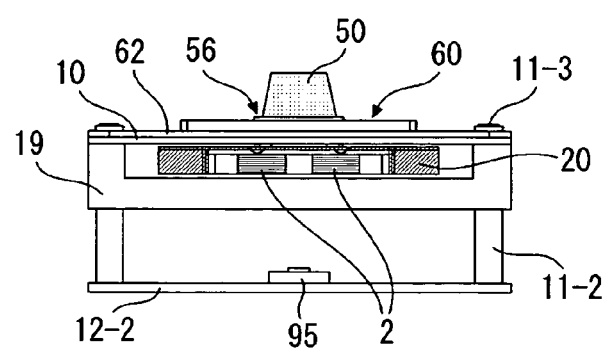

Fig. 21A
Fig. 21C
Fig. 21B
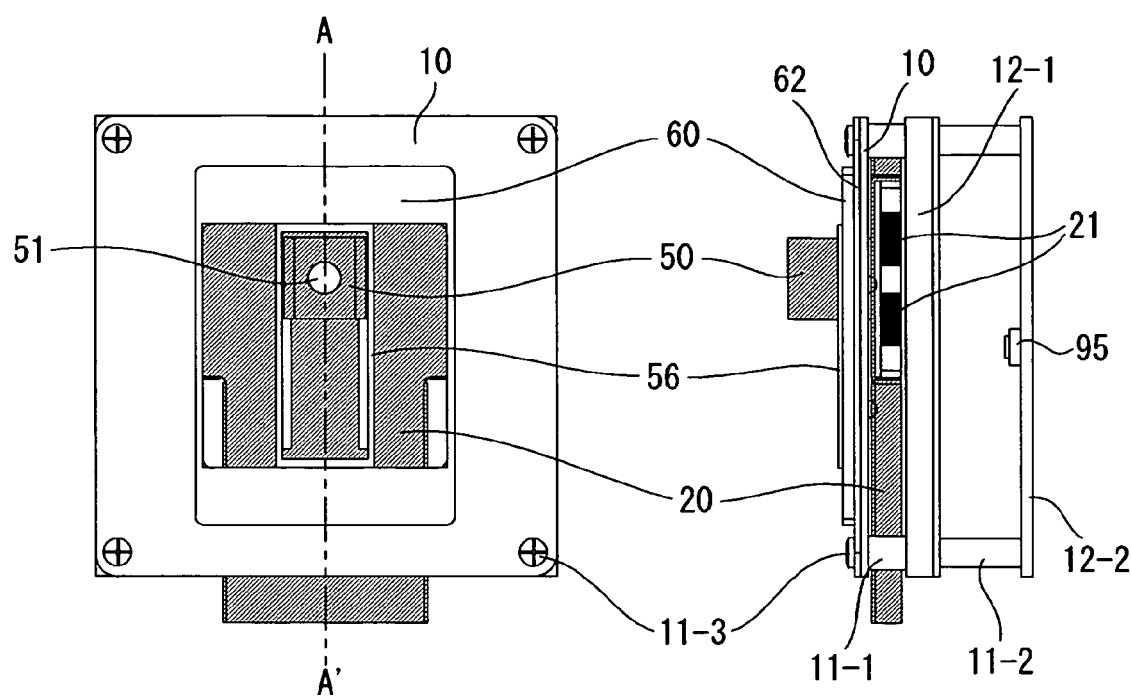
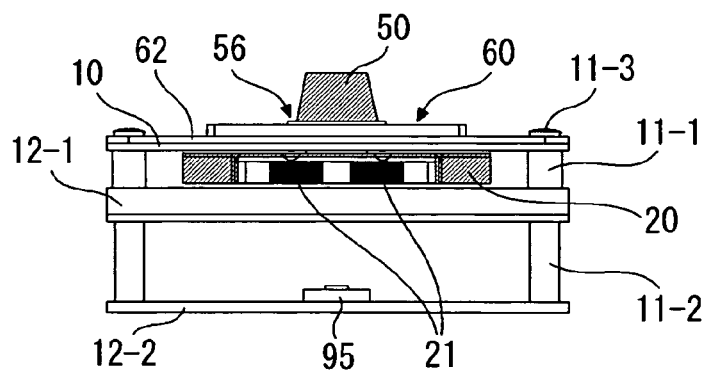

○ X DIRECTION
□ Y DIRECTION

INPUT DEVICE

BACKGROUND OF THE INVENTION

1. Field of the Invention

The present invention relates to an input device that includes an actuator equipped with a mobile part that faces fixed magnets and moves in relation to the fixed magnets.

2. Description of the Related Art

In recent years, devices equipped with actuators have been developed as user interfaces having feedback functions for users. Japanese Unexamined Patent Publication No. 2000-330688 (hereinafter referred to Prior Art 1) discloses an information receiving apparatus as an example having an actuator in which coils are arranged as opposed to magnets arranged in a flat state. In this apparatus, current to be supplied to the coils is controlled so as to move the coils in relation to the magnets. Accordingly, it is possible to stimulate users' sense of touch by controlling the actuator.

In a case where the actuator is incorporated into a mouse that is normally used for personal computers, it is possible to transmit various forms of information to users from a computer via the mouse. For instance, click points can be made recognizable through vibration, or users can feel as if they were actually shooting a gun or an arrow in a computer game or the like. In other words, a conventional mouse can be utilized as a man-machine interface.

However, the function of feeding information back to a user through his/her sense of touch is not valid unless the user is touching the actuator. Driving the actuator when the user is not touching it leads to waste of power, and the life of the actuator as the driving unit is shortened wastefully.

In the invention disclosed in Prior Art 1, light receiving elements are arranged on the surface of the actuator, so that a touch detector can be activated when a finger is placed on the light receiving elements. In this prior art, an operation is stopped in accordance with a signal notifying that a finger has already been removed from the light receiving elements. Thus, waste of power is prevented when a user is not touching the actuator, and shortening of the life of the actuator can be avoided (specifically shown in FIG. 5 of Prior Art 1).

In a case where the above actuator is incorporated into a conventional mouse or the like, however, it is necessary to maintain a space to accommodate magnets and coils. With this actuator, the number of components is increased, and the entire structure is further complicated, resulting in difficulty in assembling. Also, other problems, such as increase of production costs, are caused. In a case of incorporating a touch detector utilizing light receiving elements, the above problems are even more serious.

SUMMARY OF THE INVENTION

It is therefore an object of the present invention to provide an input device in which the above disadvantage is eliminated.

A more specific object of the present invention is to provide a novel input device that is small and easy to assemble, can smoothly operate in a conventional device, and is equipped with a switch function for switching on and off operations.

The above objects of the present invention are achieved by an input device comprising: magnets that are arranged in a flat state; coils that are arranged so as to face the magnets, and are moved in relation to the magnets; a mobile member that is connected to the coils; a first guide member that slidably guides the mobile member; a second guide member that slidably guides the first guide member in a direction perpendicular to the sliding direction of the mobile member; and a switch that is operated by an operator to carry out an input operation, the switch being formed on the mobile member.

The above objects of the present invention are also achieved by an input device comprising: coils that are arranged in a flat state; magnets that are arranged so as to face the coils, and are moved in relation to the coils; a mobile member that is connected to the magnets; a first guide member that slidably guides the mobile member; a second guide member that slidably guides the first guide member in a direction perpendicular to the sliding direction of the mobile member; and a switch that is operated by an operator to carry out an input operation, the switch being formed on the mobile member.

The above objects of the present invention are also achieved by an input device comprising: magnets that are arranged in a flat state; coils that are arranged so as to face the magnets, and are moved in relation to the magnets; a mobile member that is connected to the coils; a first holding member that slidably holds the mobile member; a second holding member that slidably holds the first guide member in a direction perpendicular to the sliding direction of the mobile member; and a switch that is operated by an operator to carry out an input operation, the switch being formed on the mobile member.

The above objects of the present invention are also achieved by an input device comprising: coils that are arranged in a flat state; magnets that are arranged so as to face the coils, and are moved in relation to the coils; a mobile member that is connected to the magnets; a first holding member that slidably holds the mobile member; a second holding member that slidably holds the first guide member in a direction perpendicular to the sliding direction of the mobile member; and a switch that is operated by an operator to carry out an input operation, the switch being formed on the mobile member.

BRIEF DESCRIPTION OF THE DRAWINGS

Other objects, features and advantages of the present invention will become more apparent from the following detailed description when read in conjunction with the accompanying drawings, in which:

FIG. 20A is a plan view of an input device in accordance with a sixth embodiment of the present invention;

FIG. 20B is a front view of the input device in accordance with the sixth embodiment;

FIG. 20C is a side view of the input device in accordance with the sixth embodiment;

FIG. 21A is a plan view of an input device in accordance with a seventh embodiment of the present invention;

FIG. 21B is a front view of the input device in accordance with the seventh embodiment;

FIG. 21C is a side view of the input device in accordance with the seventh embodiment;

DESCRIPTION OF THE PREFERRED EMBODIMENTS

The following is a detailed description of the present invention, with reference to the accompanying drawings. The principles of the present invention will be first described briefly.

(Principles of the Invention)

Figure 1A:
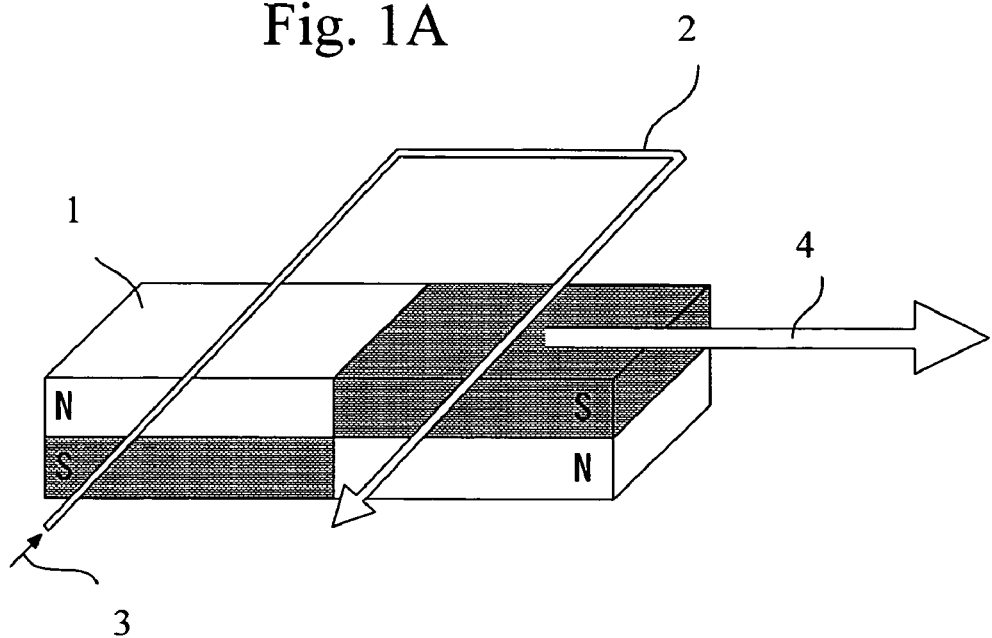
FIG. 1A illustrates a structure to explain the Fleming's left-hand rule.
Figure 1B:
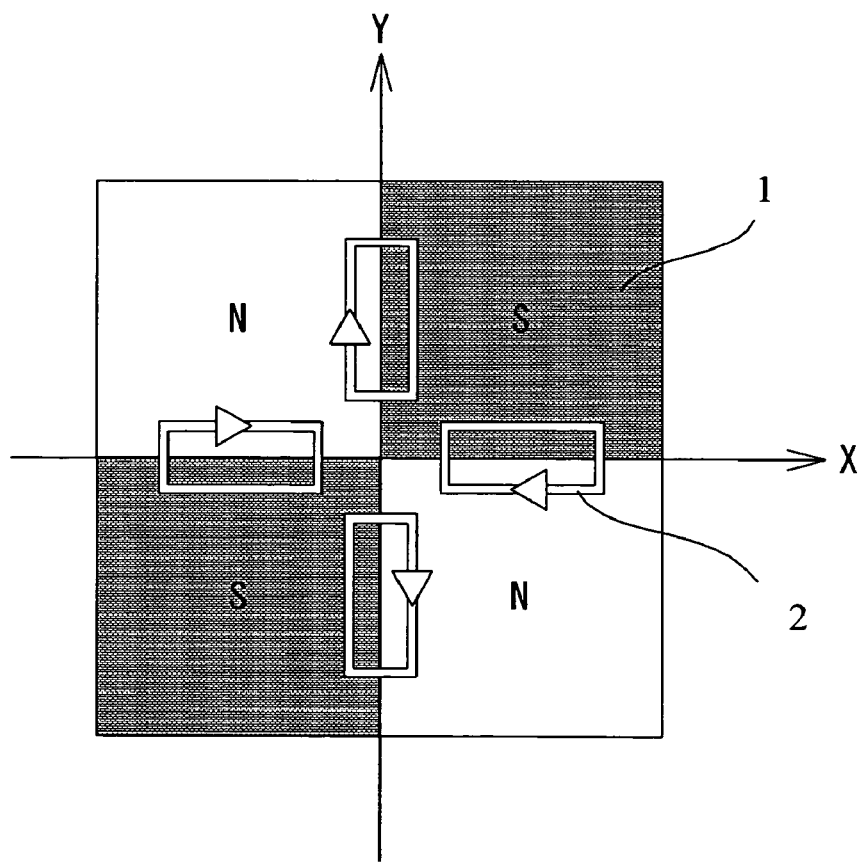
FIG. 1B schematically illustrates a structure that includes magnets and coils in accordance with the present invention.

FIGS. 1A and 1B illustrate the relationship between magnets and coils. The so-called "Fleming's left-hand rule" is applied to the present invention. FIG. 1A illustrates the Fleming's left-hand rule. As shown in FIG. 1A, a coil 2 is located in the vicinity of magnets 1. When a current 3 flows in the direction indicated by the thinner arrow, a thrust force 4 is generated in the coil 2 in the direction indicated by the thicker arrow. This embodies the Fleming's left-hand rule. FIG. 1B illustrates a structure that includes magnets 1 and coils 2 in accordance with the present invention. As shown in FIG. 1B, the coils 2 are arranged over the magnets 1 that has N-poles and S-poles arranged alternately in a flat state. The coils 2 are fixed to a slidable member (not shown), and the current to be supplied to the coils 2 is controlled, so that the coils 2 can be moved within the X-Y plane or two-dimensionally by virtue of the thrust force shown in FIG. 1A. The present invention provides an actuator that is formed by utilizing the above structure.

Figure 2A:
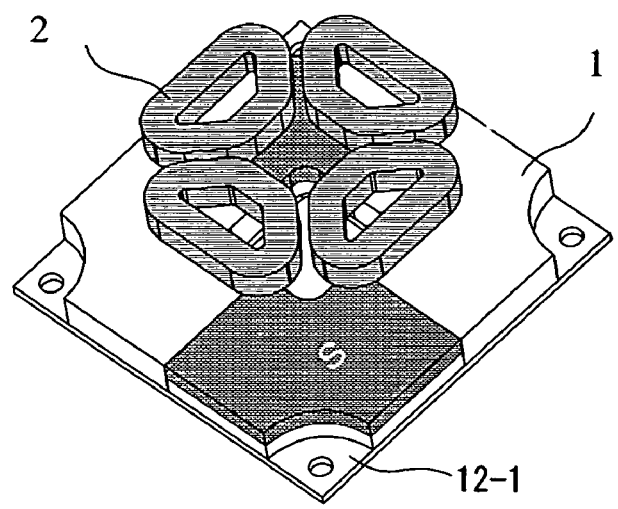
FIGS. 2A through 2C illustrate the structure of FIG. 1B in greater detail.
Figure 2B:
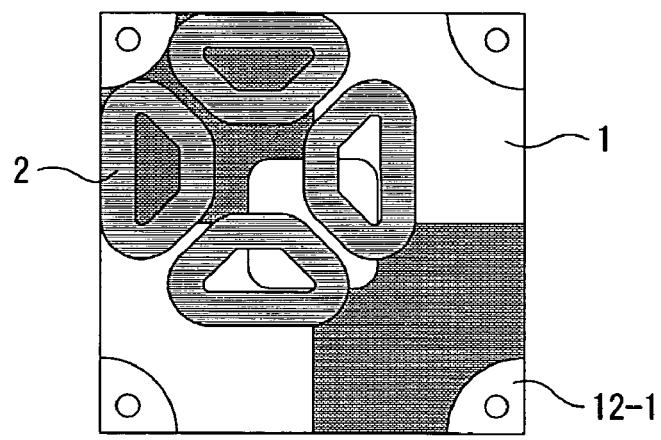
Figure 2C:
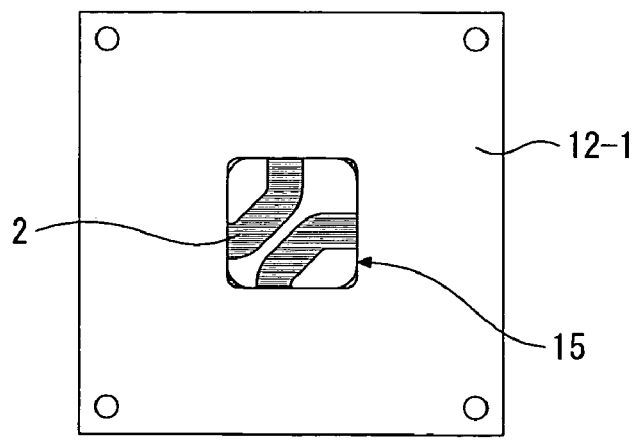

FIGS. 2A through 2C illustrate the structure of FIG. 1B in greater detail. FIG. 2A is a perspective view illustrating the relationship between the magnets 1 and the coils 2. FIG. 2B is a plan view of the same, and FIG. 2C is a bottom view of the same. As shown in FIGS. 2A through 2C, the magnets 1 are fixed onto a bottom plate 12-1. The coils 2 are arranged over the coils 1 that are arranged in a flat state. The coils 2 move two-dimensionally (in-plane motion) while facing the magnets 1. In this example, the bottom plate 12-1 has an opening 15 for detecting movements of the coils 2.

The magnets 1 shown in FIG. 1B and FIGS. 2A through 2C may be permanent magnets or electromagnets. It is also possible to fix the coils 2 while allowing the magnets 1 to move.

Figure 3:
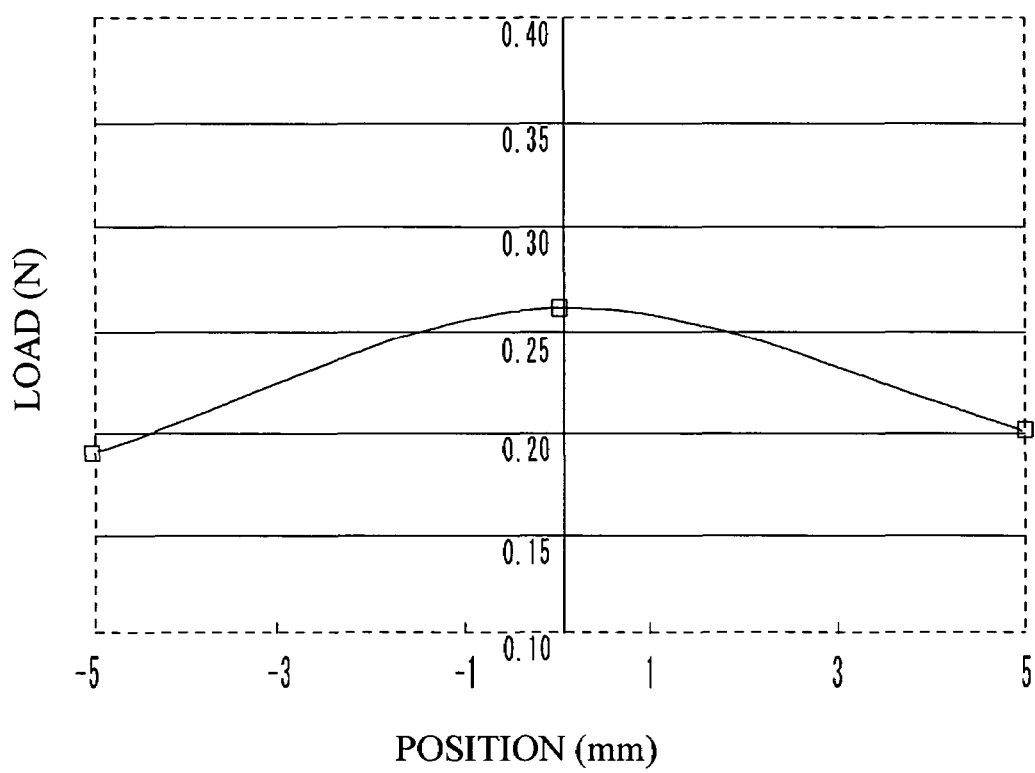
FIG. 3 shows the relationship between the position of the coils and thrust force in the X-direction and the Y-direction in the structure of FIG. 1B.

FIG. 3 shows the relationship between the coil position in the X-Y directions in FIG. 1B and the thrust force (a load N). In FIG. 3, the abscissa axis indicates the coil position, and the ordinate axis indicates the load N caused in the coils 2. Here, a current of 200 mA flows through the coils 2, and the magnets 1 are of 12000 Gauss. In FIG. 1B, when being located in the center position, the coils 2 are laid across the N-poles and the S-poles of the magnets 1. FIG. 3 shows that the largest load N is caused in the coils 2 located in the center position, and that a sufficient load N can be obtained even when the coils 2 are located in a position shifted from the center position by ±5 mm. In the following, embodiments of the present invention will be described, with reference to the accompanying drawings.

FIRST EMBODIMENT

Figure 4A:
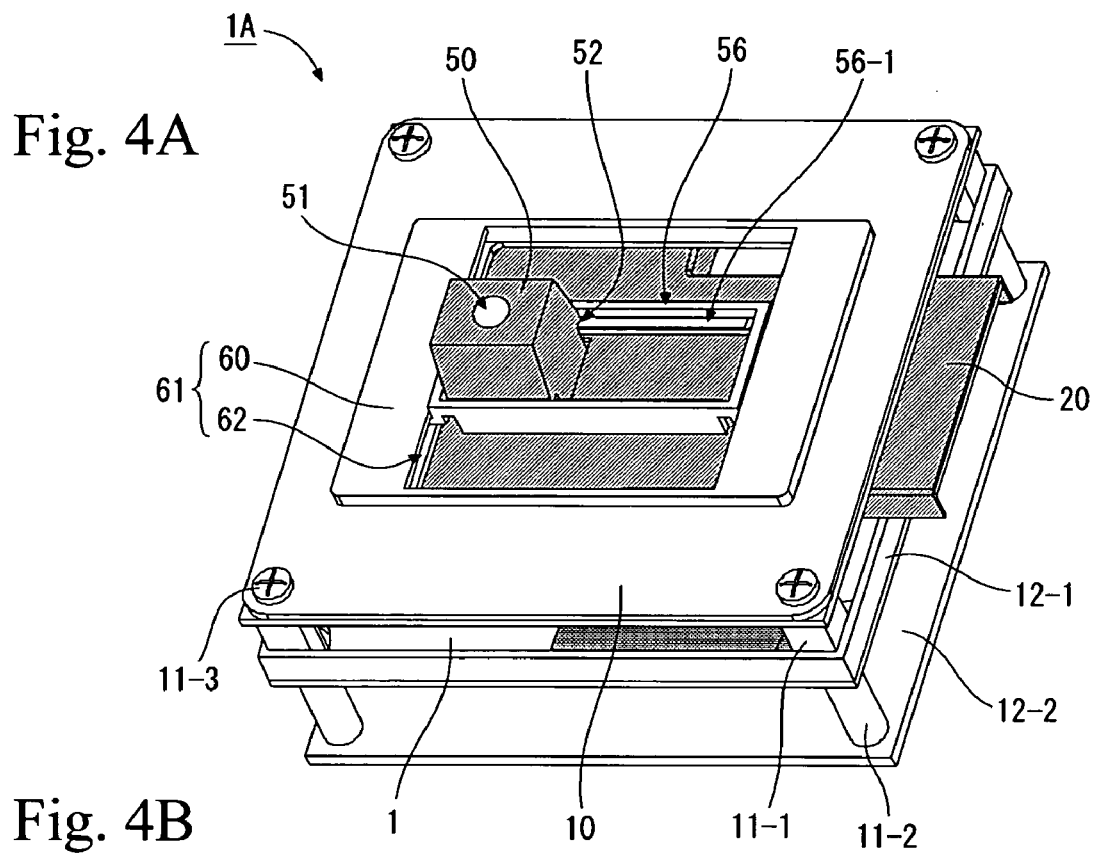
FIGS. 4A and 4B are perspective views of the exterior of an input device in accordance with a first embodiment of the present invention.
Figure 4B:
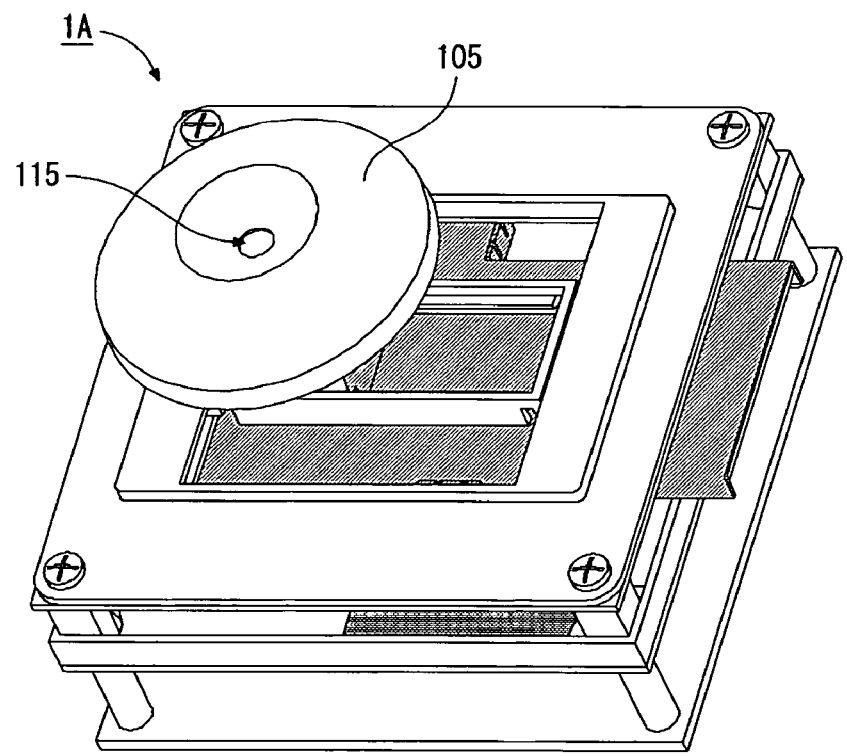
Figure 5A:
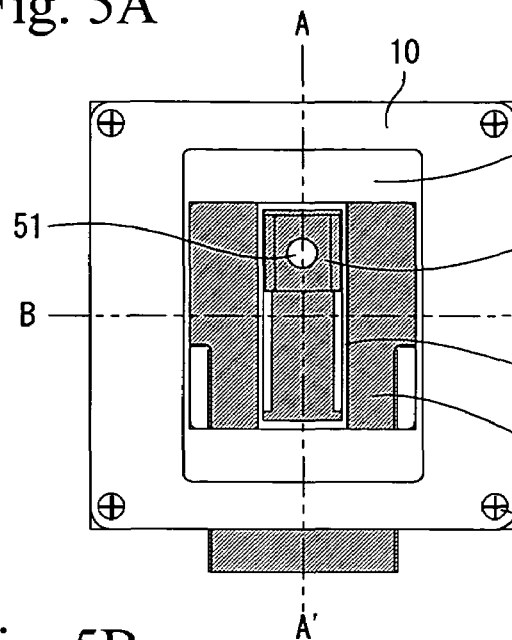
FIG. 5A is a plan view of the input device in accordance with the first embodiment.
Figure 5D:
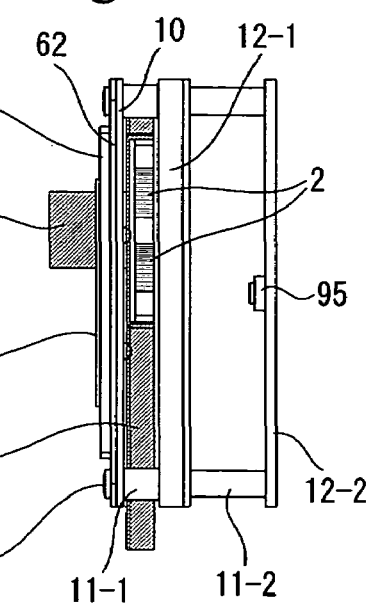
FIG. 5D is a side view of the input device in accordance with the first embodiment.
Figure 5B:
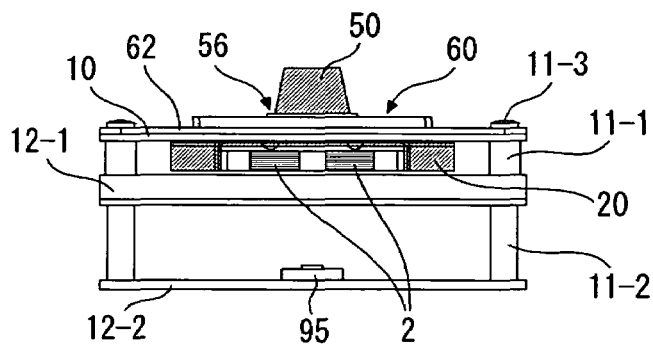
FIG. 5B is a front view of the input device in accordance with the first embodiment.
Figure 5C:
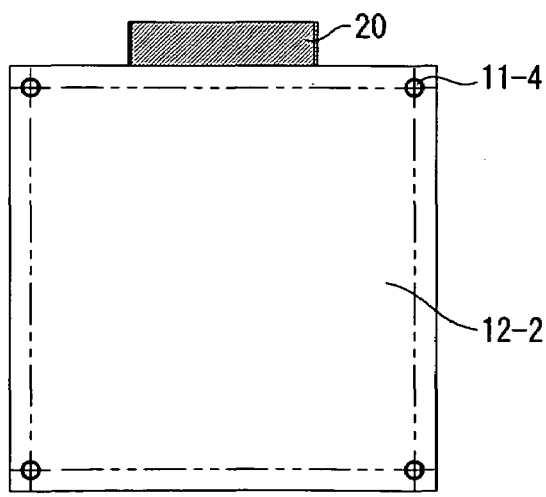
FIG. 5C is a bottom view of the input device in accordance with the first embodiment.
Figure 6:
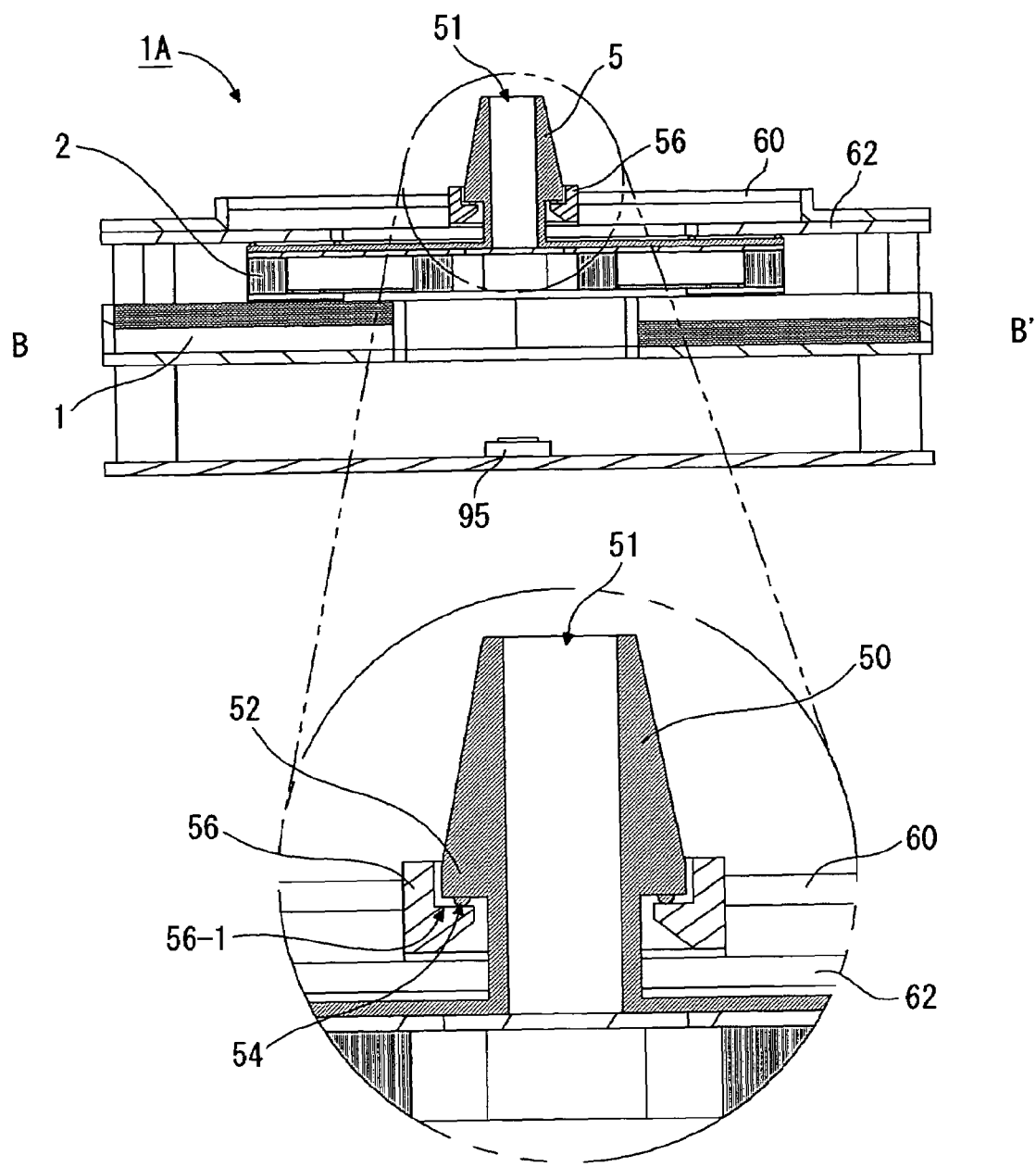
FIG. 6 is a section view of a mobile mechanism of the input device, taken along the line B–B' of FIG. 5A.
Figure 7:
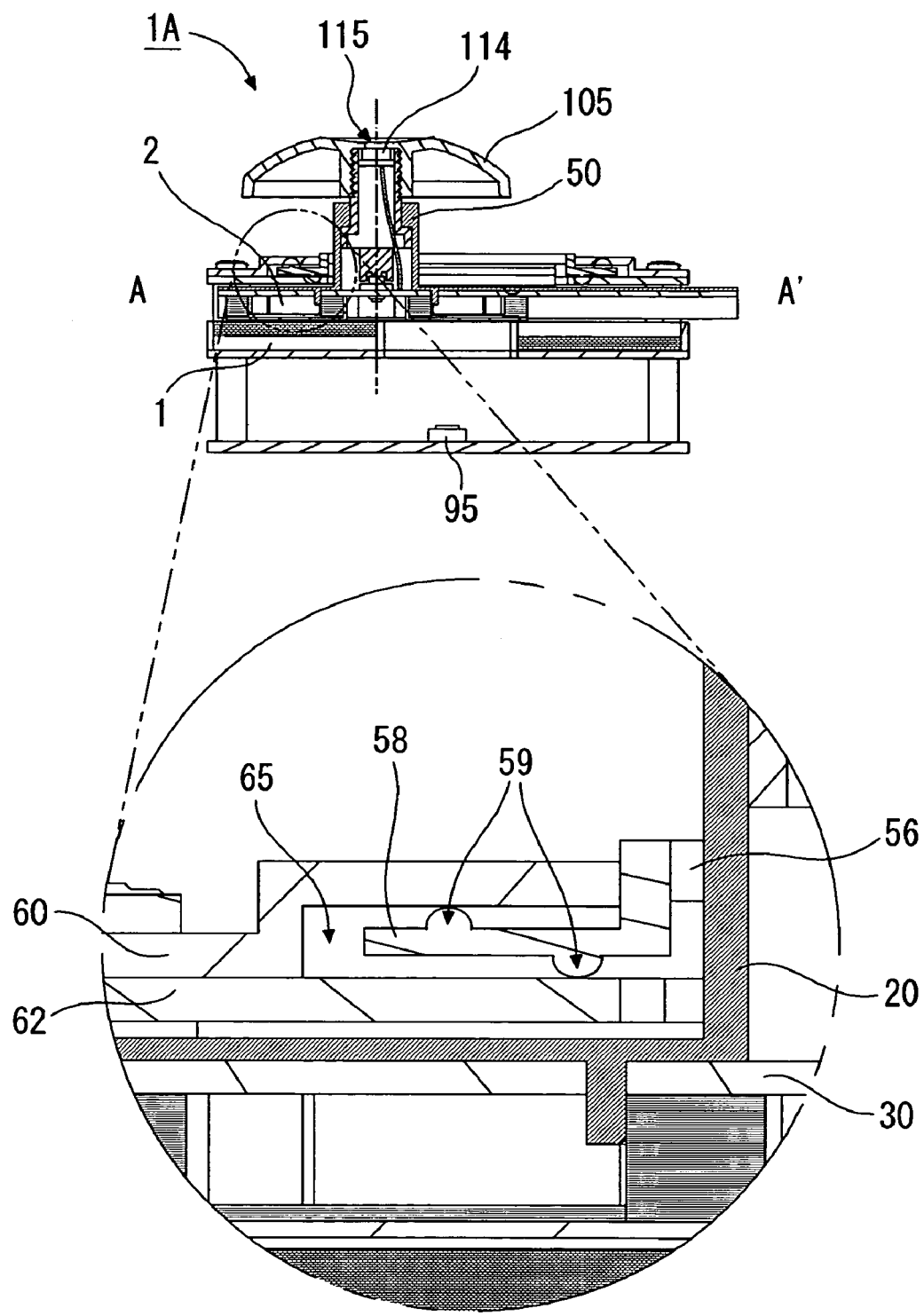
FIG. 7 is a section view of the mobile mechanism of the input device, taken along the line A–A' of FIG. 5A.
Figure 8:
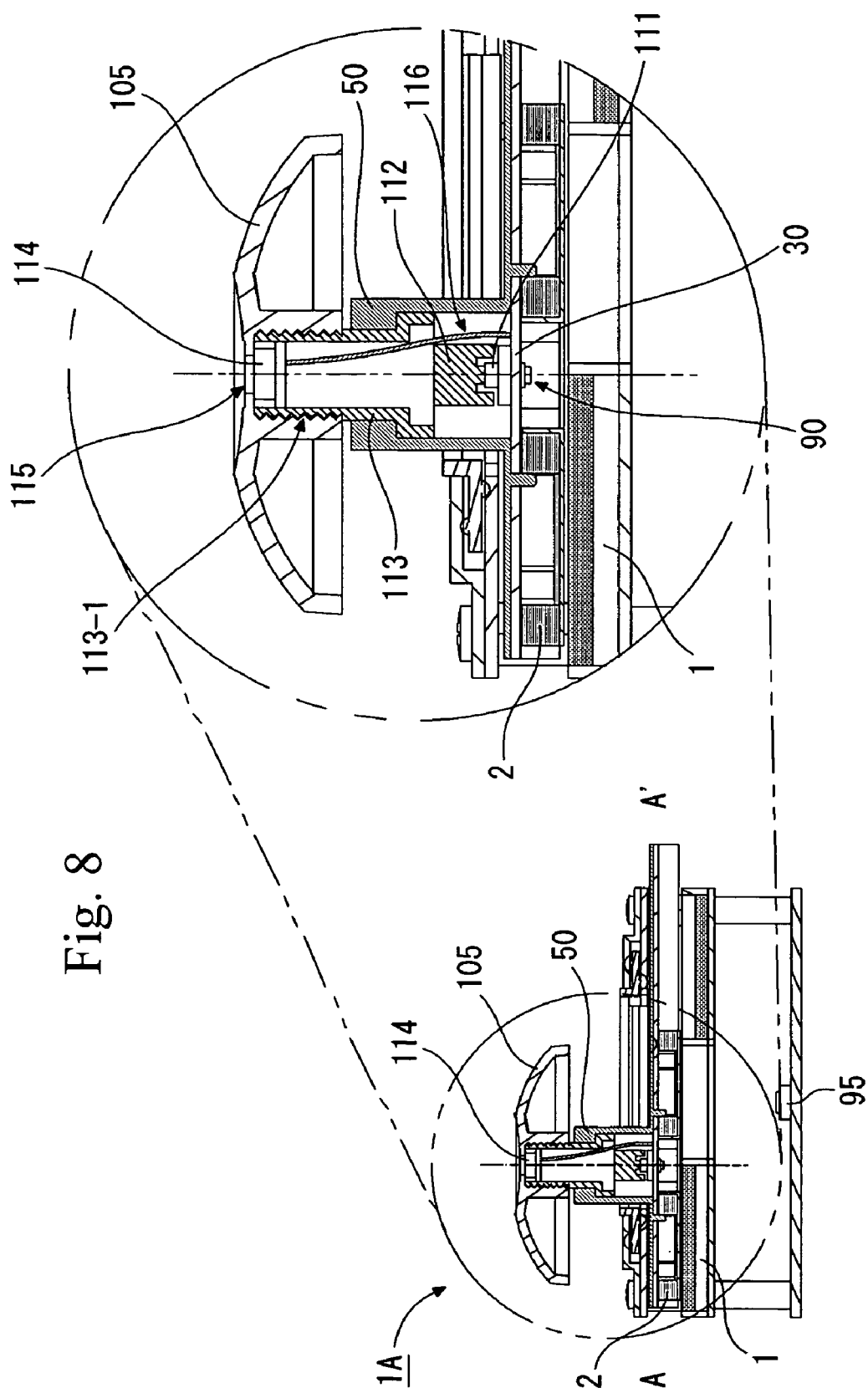
FIG. 8 is a section view of the input device having the mobile piece equipped with a switch mechanism, taken along the line A–A' of FIG. 5A.

FIGS. 4A through 8 illustrate an input device 1A in accordance with a first embodiment of the present invention. More specifically, FIG. 4A is an external perspective view of the input device 1A that is not equipped with a switch mechanism. FIG. 4B is an external perspective view of the input device equipped with a switch mechanism. FIG. 5A is a plan view of the input device 1A, FIG. 5B is a front view of the input device 1A, FIG. 5C is a bottom view of the input device 1A, and FIG. 5D is a side view of the input device 1A. FIG. 6 is a section view illustrating the structure of the mobile mechanism of the input device 1A, taken along the line B–B' of FIG. 5A. FIG. 7 is a section view illustrating the structure of the mobile mechanism of the input device 1A, taken along the line A–A' of FIG. 5A. FIG. 8 is a section view illustrating the structure of the input device 1A equipped with the switch mechanism, taken along the line A–A' of FIG. 5A. The input device 1A is formed as a component to be incorporated into a mouse, a controller, or the like.

As shown in FIGS. 4A through 8, the actuator part of the input device 1A includes magnets 1 and coils 2 arranged on a bottom plate 12-1. The magnets 1 have magnet poles alternately arranged in a flat state on the bottom plate 12-1 (see FIGS. 2A through 2C). A supporting plate 10 is placed over the bottom plate 1-21, with spacers 11-1 being interposed between the supporting plate 10 and the bottom plate 12-1. A mobile mechanism for two-dimensionally moving the coils 2 is formed on the supporting plate 10.

Figure 10A:
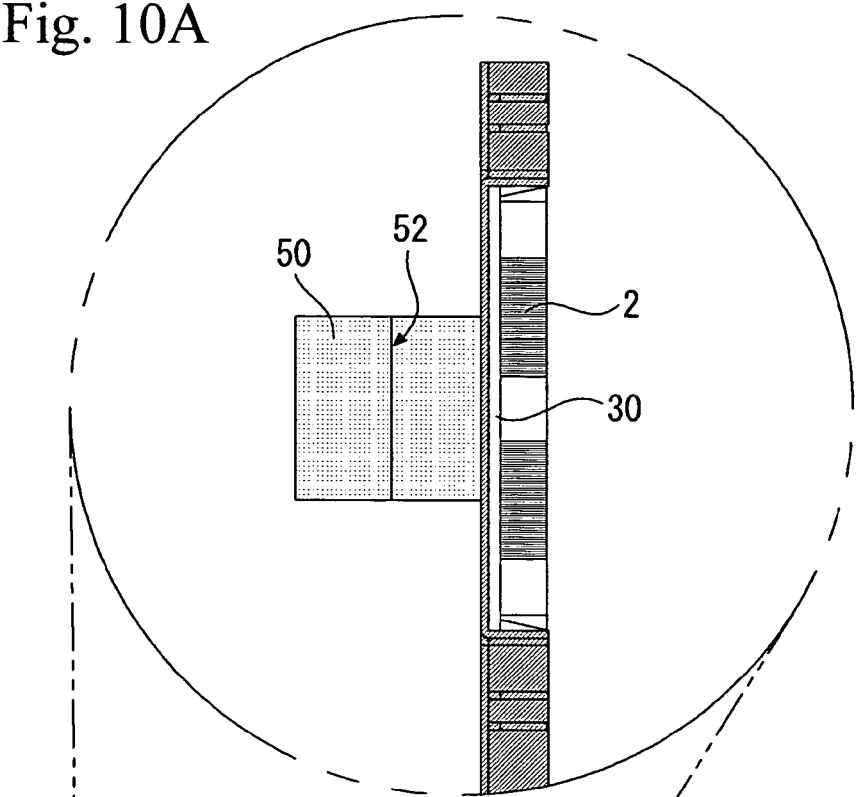
FIG. 10A is a side view of the slider of the input device in accordance with the first embodiment.
Figure 10B:
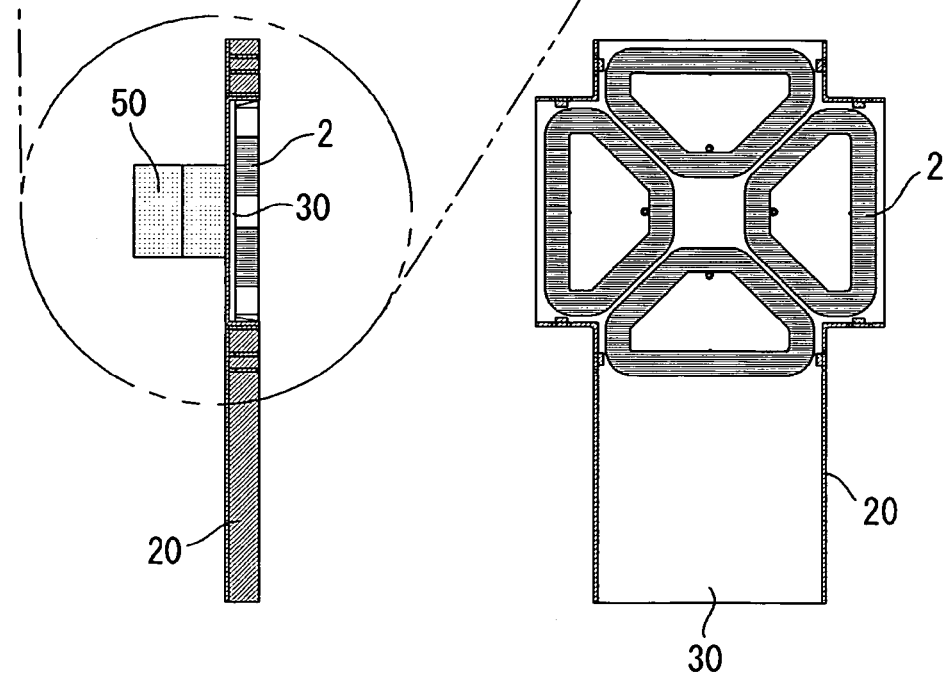
FIG. 10B is a bottom view of the slider of the input device in accordance with the first embodiment.

Although only partially shown in FIG. 4A, a slider 20 to serve as a mobile member of the mobile mechanism is placed over the magnets 1, as shown in FIG. 5B. The coils 2 are held to the bottom surface of the slider 20. A mobile piece 50 protrudes from the upper surface of the input device 1A, so that users can touch the mobile piece 50. This mobile piece 50 moves with the slider 20. FIGS. 10A and 10B illustrate the slider 20. FIG. 10A is a side view (including a partially enlarged view), and FIG. 10B is a bottom view of the slider 20. A circuit board 30 is embedded in the bottom surface of the slider 20 (on the opposite side to the mobile piece 50), and the coils 2 are fixed to the circuit board 30. The mobile piece 50 is formed on the upper surface of the slider 20 (on the opposite side to the coils 2).

Referring back to FIG. 4A, the mobile piece 50 is slidably held by a first guide member 56. FIG. 6 illustrates this structure in greater detail. As shown in FIG. 6 (especially in the enlarged view), the mobile piece 50 has a claw-like engaging tongue 52 on either side, and is slidably placed on rails 56-1 that are formed on the two facing inner walls of the first guide member 56. With this structure, the mobile piece 50 can slide in the extending direction of the rails 56-1, while being held by the rails 56-1 within the first guide member 56. The regions in the first guide member 56 that are brought into contact with the mobile piece 50, i.e., the inner walls of the first guide member 56, are angled so that the contact area between the mobile piece 50 and the first guide member 56 can be reduced to minimize friction between the mobile piece 50 and the first guide member 56. Also, a hemispherical protrusion 54 is formed on the contact region of each engaging tongue 52 (on the sliding plane) in contact with the corresponding rail 56-1, so that the contact area between the rails 56-1 and the engaging tongues 52 can be reduced to minimize friction between the mobile piece 50 and the first guide member 56. The protrusions 54 may be formed on the rails 56-1 of the first guide member 56.

The first guide member 56 is slidably held by a second guide member 61. FIG. 7 illustrates this structure in greater detail. As shown in FIG. 7 (especially in the enlarged view), an end part 58 on either side of the first guide member 56 is sandwiched by an upper guide plate 60 and a lower guide plate 62 that constitute the second guide member 61. With this structure, the first guide member 56 can be slidably moved along a guide path 65 formed by the upper guide plate 60 and the lower guide plate 62. So as to reduce friction due to slide movement, protrusions 59 are scattered on or extend from the contact points between the end parts 58 and the upper and lower guide plates 60 and 62. Here, the protrusions 59 may be formed either on the end portions 58 or the upper and lower guide plates 60 and 62. The extending direction of the guide path 65 is perpendicular to the extending direction of the rails 56-1.

In the above structure, the mobile piece 50 slides within the first guide member 56 in one direction, and the first guide member 56 moves within the second guide member 61 in a direction perpendicular to the moving direction of the mobile piece 50. Accordingly, in the actuator part of the input device 1A, the mobile piece 50 can freely move two-dimensionally when the slider 20 to which the coils 2 are connected receives a predetermined thrust force. This input device 1A may be incorporated into a mouse, for example, in such a manner that an operator can touch the mobile piece 50 with his/her finger to feel a thrust force caused in the actuator part.

The mobile piece 50 is equipped with a switch mechanism, as shown in FIG. 4B. FIG. 8 illustrates the structure of the switch mechanism in greater detail. As shown in FIG. 8

(especially in the enlarged view), a button switch 111 connected to the circuit board 30 is provided at the bottom of the mobile piece 50. A pressing member 112 is provided over the button switch 111. Further, a key member 113 having a screw part 113-1 is provided over the pressing member 112. The screw part 113-1 of the key member 113 protrudes from the mobile piece 50 through an opening 51 that is formed through the upper face of the mobile piece 50. A key top 105 is screwed to the screw part 113-1. In this structure, there is a small gap allowed between the key top 105 and the mobile piece 50, so that the entire key top 105 as well as the key member 113 can be slidably moved toward the mobile piece 50. Accordingly, the button switch 111 is switched on and off when an operator handles the key top 105 to press the pressing member 112.

Further, a photointerrupter 114 as an optical switch is embedded in the center of the key top 105 that faces operators. This photointerrupter 114 may be of a light reflector type, for example, and switches on and off when covered with a hand or finger of an operator to reflect light emitted from a LED (light emitting diode) and to send the reflected light to a phototransistor. The photointerrupter 114 is connected to the circuit board 30 with a lead wire such as a jumper lead 116 that is led into the key top 105 and the mobile piece 50. The photointerrupter 114 is covered with a window 115 made of glass, transparent plastic, or quartz. If the LED uses infrared rays, infrared-ray transmitting plastic should be employed for the window 115.

Figure 9A:
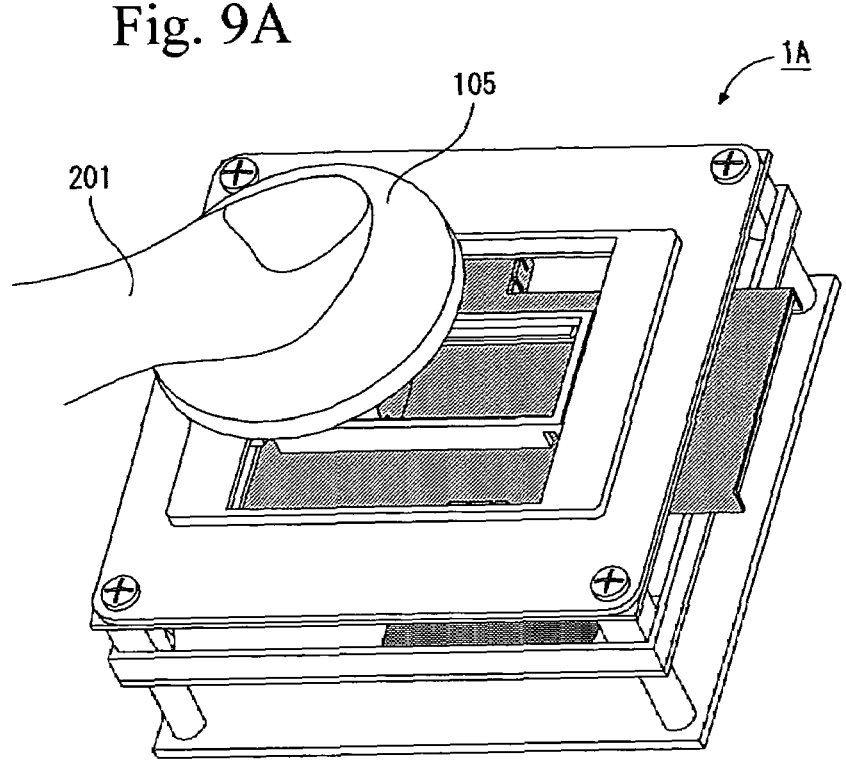
FIG. 9A is a perspective view of the input device when an operator is touching the key top with his/her finger.
Figure 9B:
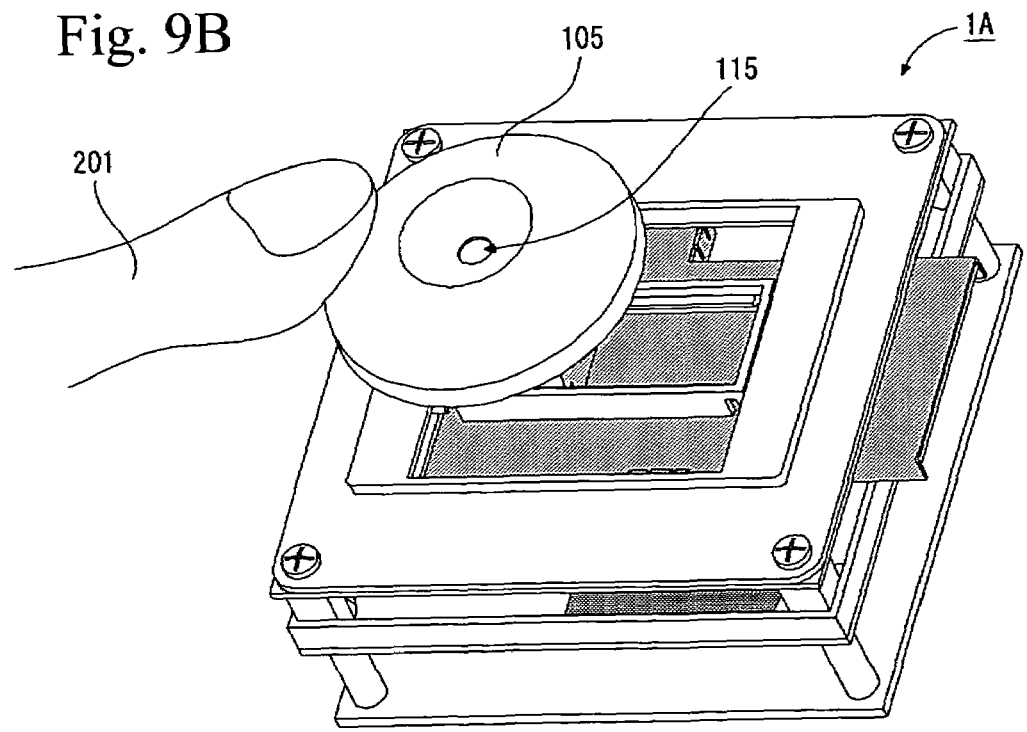
FIG. 9B is a perspective view of the input device when an operator is not touching the key top with his/her finger.

The above switch mechanism formed by the button switch 111 and the photointerrupter 114 can distinguish between an operating time and a non-operating time. With this switch mechanism, the actuator part is set to an operating mode when an operator's finger 201 is touching the key top 105 (the photointerrupter 114 in particular), as shown in FIG. 9A. When the operator's finger 201 is not touching the key top 105, as shown in FIG. 9B, the actuator part is set to a non-operating mode. In this manner, the actuator part that is formed by the coils 2 and the magnets 1 can be driven in accordance with the operation mode.

Figure 11:
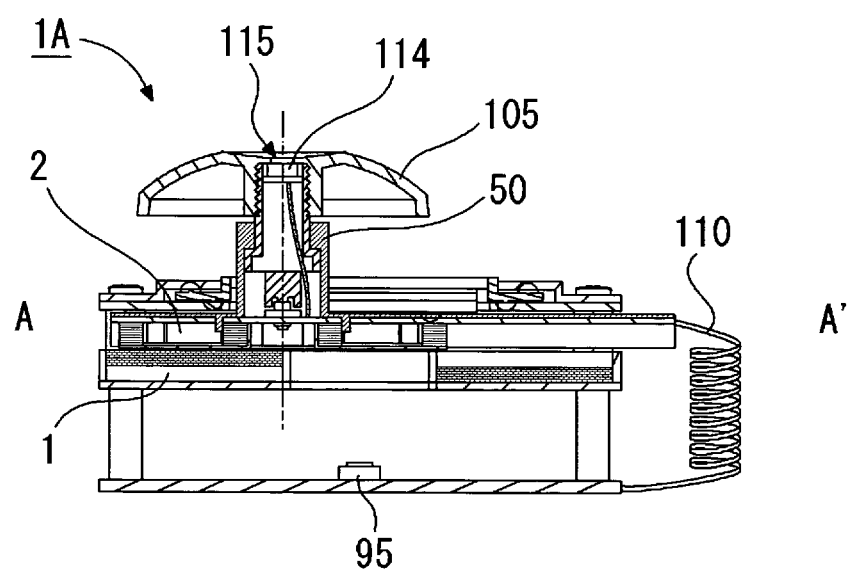
FIG. 11 is a section view of the input device having the circuit board connected to the control board with a curled cable, taken along the line A–A' of FIG. 5A.

A LED (light emitting diode) 90 is attached to the circuit board 30 on the bottom surface of the slider 20 and in the center of the four coils 2. This LED 90 emits and extinguishes light in accordance with a driving signal from a microcomputer (see a controlling microcomputer unit 42 in FIG. 15) on the circuit board 30. The controlling microcomputer unit 42 controls the LED 90 in accordance with the on/off operation of the photointerrupter 114 and/or the button switch 111. Further, a PD (photodiode) 95 is provided in a position (on a control board 12-2) facing the LED 90 via the bottom plate 12-1. This PD 95 is designed to detect the location of the LED 90 on a two-dimensional plane when the LED 90 is in a light-emitting state. With this structure, the input device 1A can detect the location of the slider 20 by virtue of the light emission of the LED 90 at an operating time (when the photointerrupter 114 and/or the button switch 11 is on) or a non-operating time (when the photointerrupter 114 and/or the button switch 111 is off). The circuit board 30 formed on the bottom surface of the slider 20 is electrically connected to the control board 12-2 with a cable such as a curled cable 110, as shown in FIG. 11, so as to minimize adverse influence (stress) on the actuator part. The circuit board 30 is a substrate on which a driver for driving the actuator part formed by the coils 2 and the magnets 1 is formed. The control board 12-2 is a substrate on which a controller for controlling the driver is formed. FIG. 11 is a section view of the input device 1A with the curled cable 110, taken along the line A–A' (the line A–A' is the same as the line A–A' of FIG. 5A).

Figure 12A:
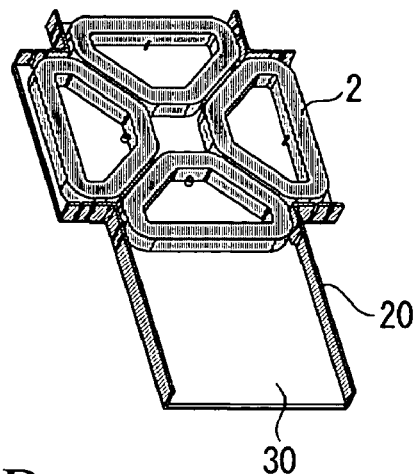
FIG. 12A is a perspective view of the slider of the input device in accordance with the first embodiment.
Figure 12B:
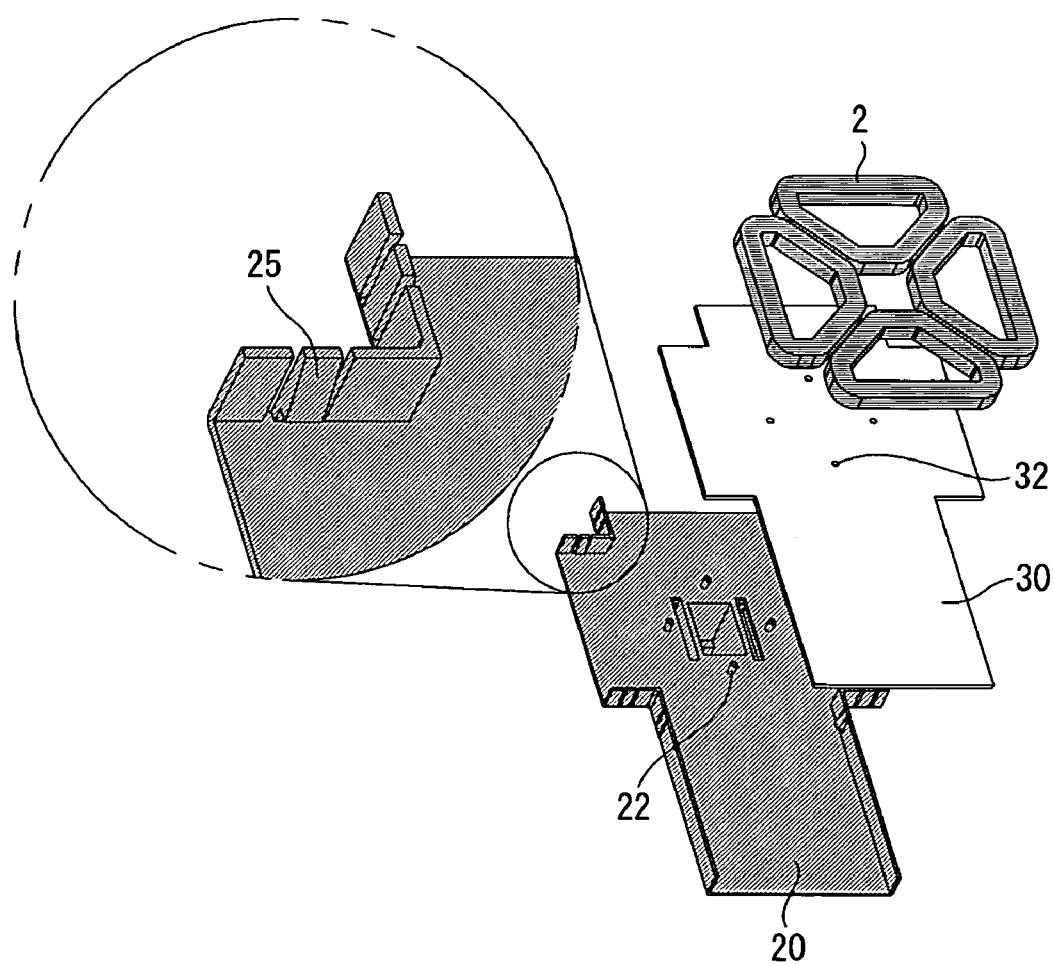
FIG. 12B is an exploded perspective view of the slider of the input device in accordance with the first embodiment.

Referring now to FIGS. 12A and 12B, an example structure that can be employed for the slider 20 of the input device 1A will be described. FIG. 12A is a perspective view of the slider 20, and FIG. 12B is an exploded perspective view of the slider 20. As shown in FIGS. 12A and 12B, the slider 20 has pins 22 for positioning the circuit board 30. The circuit board 30 has openings 32 to be engaged with the pins 22. As shown in FIG. 12A, the pins 22 also define the positions of the coils 2. With this structure, the circuit board 30 and the coils 2 can be positioned and secured to the slider 20 with high precision. Further, positioning walls stand on the periphery of the slider 20. On these walls, engaging claws 25 each having a downward taper are formed as shown in the enlarged view in FIG. 12B. Accordingly, when the circuit board 30 is pressed down, the slider 20 can support the circuit board 30 with the engaging claws 25.

Figure 13A:
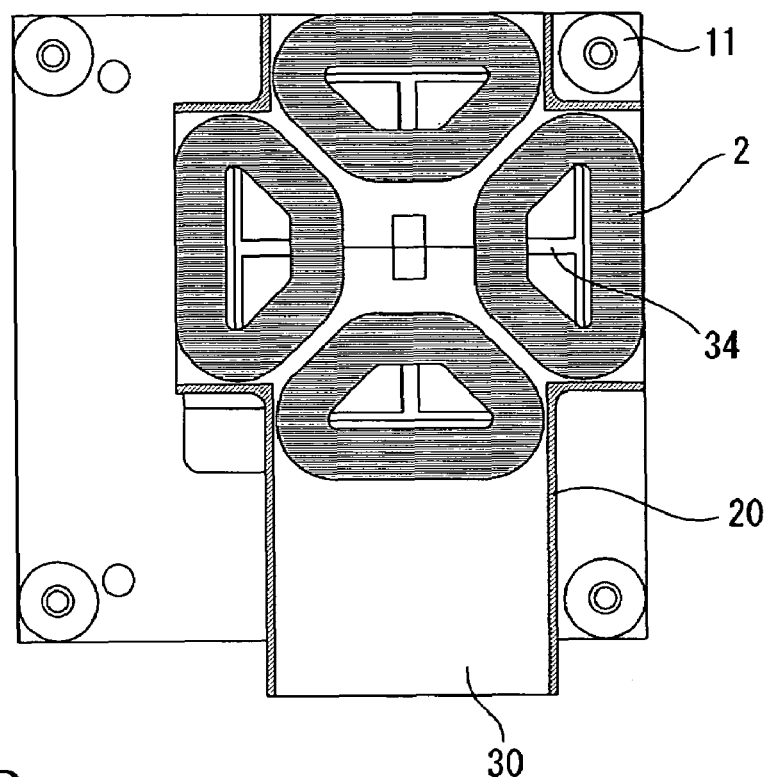
FIG. 13A is a top view of another example of the slider in accordance with the first embodiment.
Figure 13B:
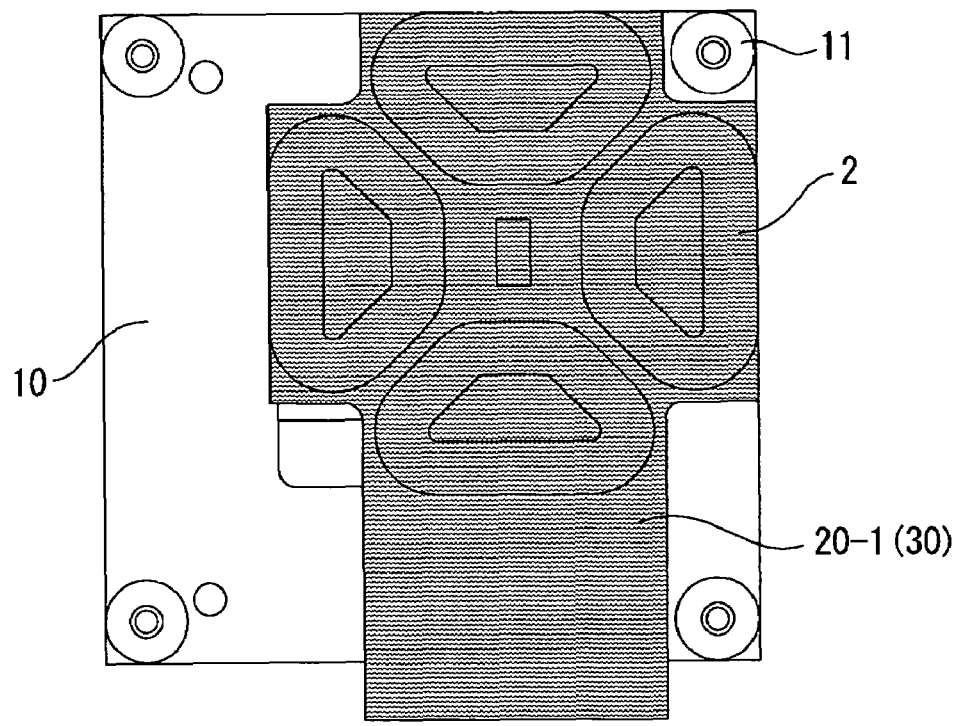
FIG. 13B is a bottom view of another example of the slider in accordance with the first embodiment.

FIGS. 13A and 13B illustrate other example structures of the slider 20. FIG. 13A shows a structure in which the circuit board 30 has ribs 34 for positioning the coils 2. With the ribs 34 being formed on the slider 20, the coils 2 can be secured to predetermined positions on the circuit board 30. FIG. 13B shows a structure in which the coils 2 are integrally formed with the circuit board 30 when the circuit board 30 is molded from a resin material 20-1. In this case, the coils 2 can be secured to the circuit board 30, because the coils 2 are embedded in the resin material 20-1. Furthermore, the parts for securing the coils 2 that are required in the structure shown in FIGS. 12A and 12B are not necessary in this case.

Figure 14:
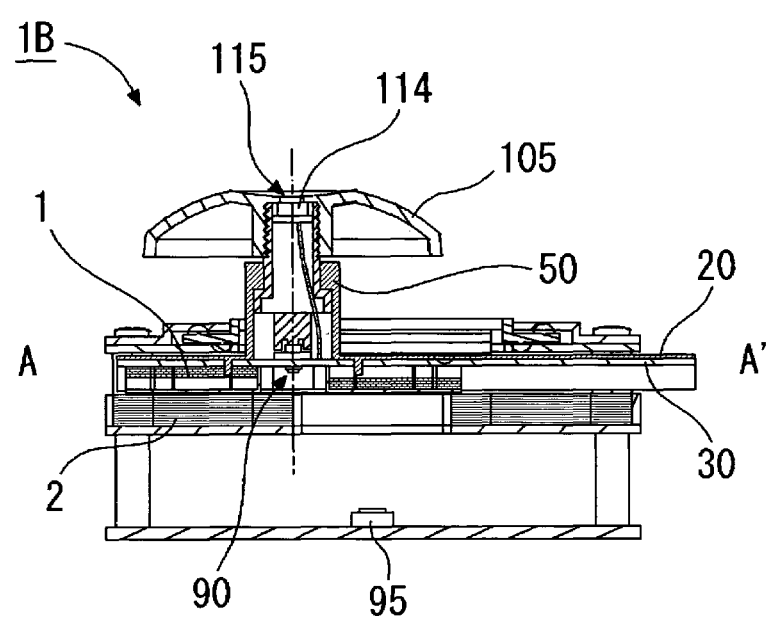
FIG. 14 is a section view of a modification of the input device of the first embodiment, replacing the coils 2 with the magnets 1 and vice versa, taken along the same line as the line A–A' of FIG. 5A.

Next, a modification (an input device 1B) of the input device 1A of the first embodiment will be described in detail. In this modification, the actuator part of the input device 1A shown in FIG. 4A is embodied in a self-complete structure having the magnets 1 secured onto the bottom plate 12-1. With the actuator part being regarded as one component, the same desired function can be obtained, even if the magnets 1, instead of the coils 2, are fixed onto the circuit board 30. This structure shown in FIG. 14 is the same as the structure shown in FIG. 4, except for the bottom plate 12-1 and the magnets 1 on the bottom plate 12-1. Accordingly, only a half-complete actuator without the bottom plate 12-1 and the magnets 1 on the bottom plate 12-1 needs to be prepared.

Figure 15:
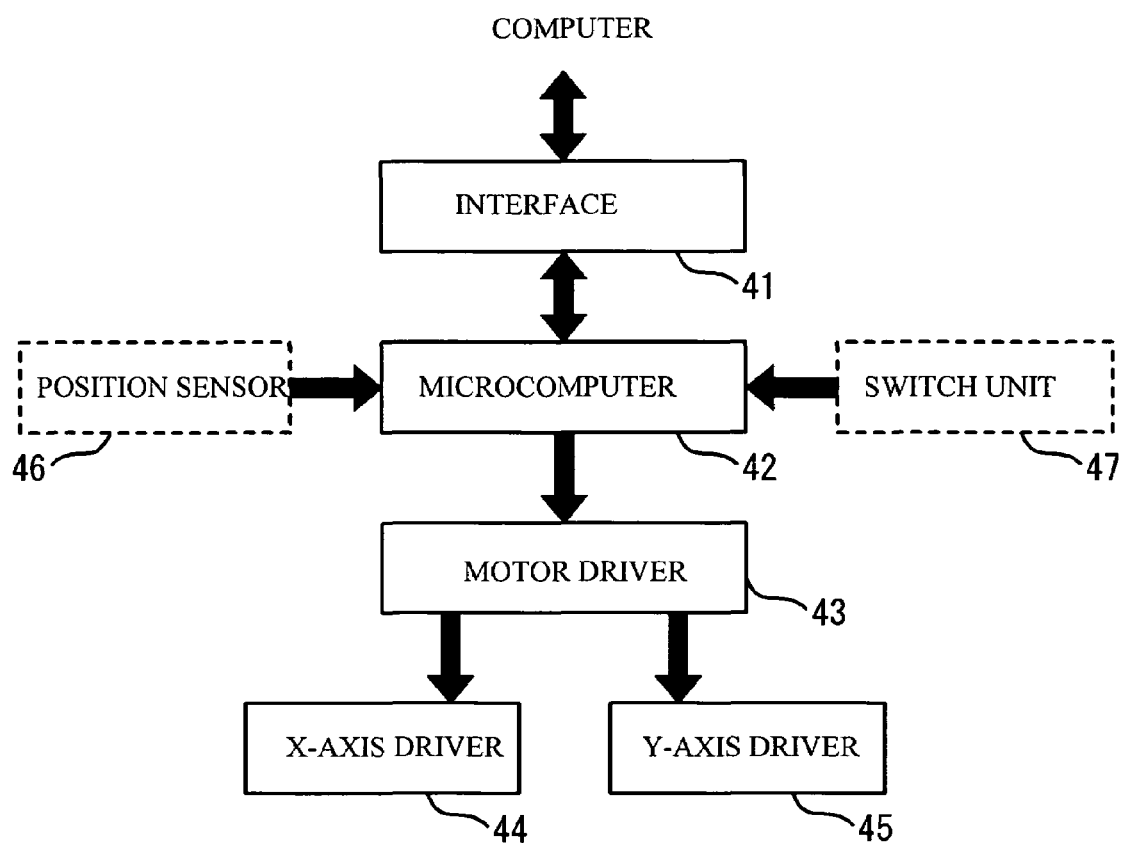
FIG. 15 is a block diagram schematically illustrating the input device and its modification in accordance with the first embodiment.

FIG. 15 is a block diagram schematically illustrating the structure of the input device 1A (or 1B) in accordance with this embodiment. In the input device 1A, a CPU or the like in the circuit board 30 serves as the controlling microcomputer unit 42 and controls the current to be supplied to the coils 2. The controlling microcomputer unit 42 is connected to an external device such as a computer via an interface unit 41. In accordance with a signal supplied from the computer, the controlling microcomputer unit 42 supplies a driving signal to a motor driver 43. In accordance with the driving signal, the motor driver 43 adjusts the current to be supplied to an X-axis driving unit 44 and a Y-axis driving unit 45. The X-axis driving unit 44 and the Y-axis driving unit 45 are equivalent to the coils 2.

In a case where this actuator is incorporated into a mouse, it is necessary to detect the locations of the coils 2. In that case, a signal is supplied from a location sensor unit 46 to the controlling microcomputer unit 42 to detect the locations of the coils 2. The location sensor unit 46 is formed by the LED 90 located immediately below the mobile piece 50 and the PD 95 located on the bottom plate 12-2.

So as to restrict the above operation to times when an operator is operating the actuator part, the controlling microcomputer unit 42 supplies a driving signal to the motor driver 43 only when a switch unit 47 is on (or only when the switch unit 47 is off). The switch unit 47 is formed by the button switch 111 and/or the photointerrupter 114.

With the above structure, it is possible to realize a novel input device that is small-sized, easy to assemble, can be smoothly incorporated into a conventional device, and is equipped with a switch mechanism to switch on and off operations.

SECOND EMBODIMENT

Next, a second embodiment of the present invention will be described in detail, with reference to the accompanying drawings. In the following description, the same components as those of the first embodiment are denoted by the same reference numerals as those of the first embodiment, and explanation of them will not be repeated. In the first embodiment, the button switch 111 and the photointerrupter 114 are used as a switch mechanism. In this embodiment, on the other hand, only the button switch 111 is used as a switch mechanism, and the entire structure is simplified accordingly.

Figure 16:
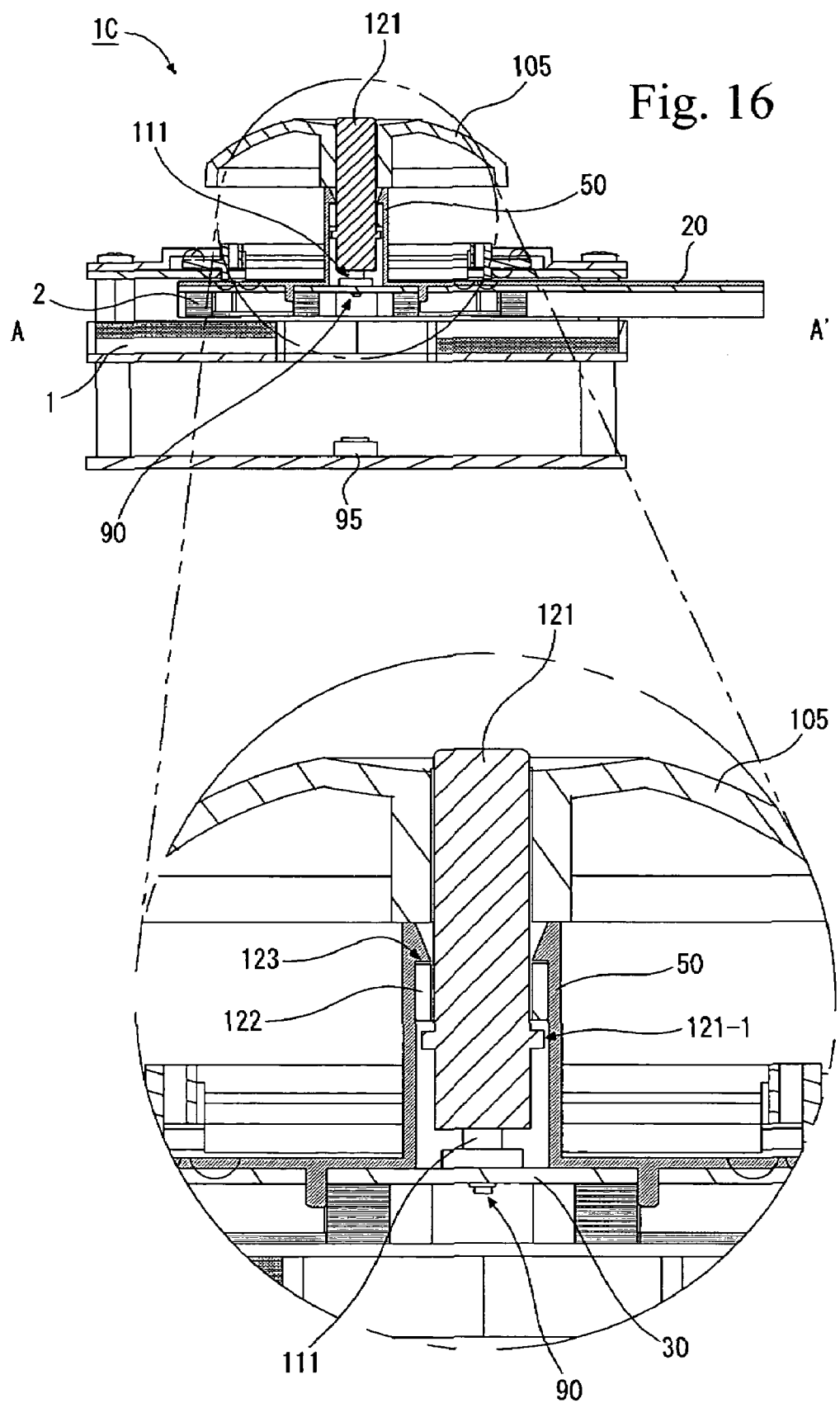
FIG. 16 is a section view of an input device in accordance with a second embodiment of the present invention, taken along the same line as the line A–A' of FIG. 5A.

FIG. 16 is a section view of an input device 1C in accordance with this embodiment, taken along the same line as the line A–A' of FIG. 5A. As shown in FIG. 16, the switch mechanism provided onto the input device 1C is formed by the button switch 111 that is connected to the circuit board 30 at the bottom of the mobile piece 50 in the same manner as in the first embodiment. In this embodiment, a pressing member 121 is provided onto the button switch 111. This pressing member 121 penetrates the opening 51 (see FIGS. 4A and 5A) formed through the upper part of the mobile piece 50 and the key top 105, and protrudes from the upper surface of the key top 105. The key top 105 is secured onto the upper part of the mobile piece 50. Accordingly, when an operator presses the pressing member 121 protruding from the key top 105, the button switch 111 located immediately below the pressing member 121 is switched on and off. Claws 123 are formed on the inner wall of the opening 51, and packing members 122 of the shape matching the shape of the opening 51 are engaged with the claws 123. In this structure, the furthest point the pressing member 121 can go down is the point at which the packing members 122 are brought into contact with a ring-like convex part 121-1 formed on the pressing member 121 inside the mobile piece 50. The other aspects of this embodiment are the same as those of the first embodiment, and therefore, explanation of them is omitted herein.

In the above manner, the switch mechanism can be formed by only a mechanical structure. With this switch mechanism, the entire structure can be simplified, and an input device can be readily manufactured at lower production costs.

THIRD EMBODIMENT

Figure 17:
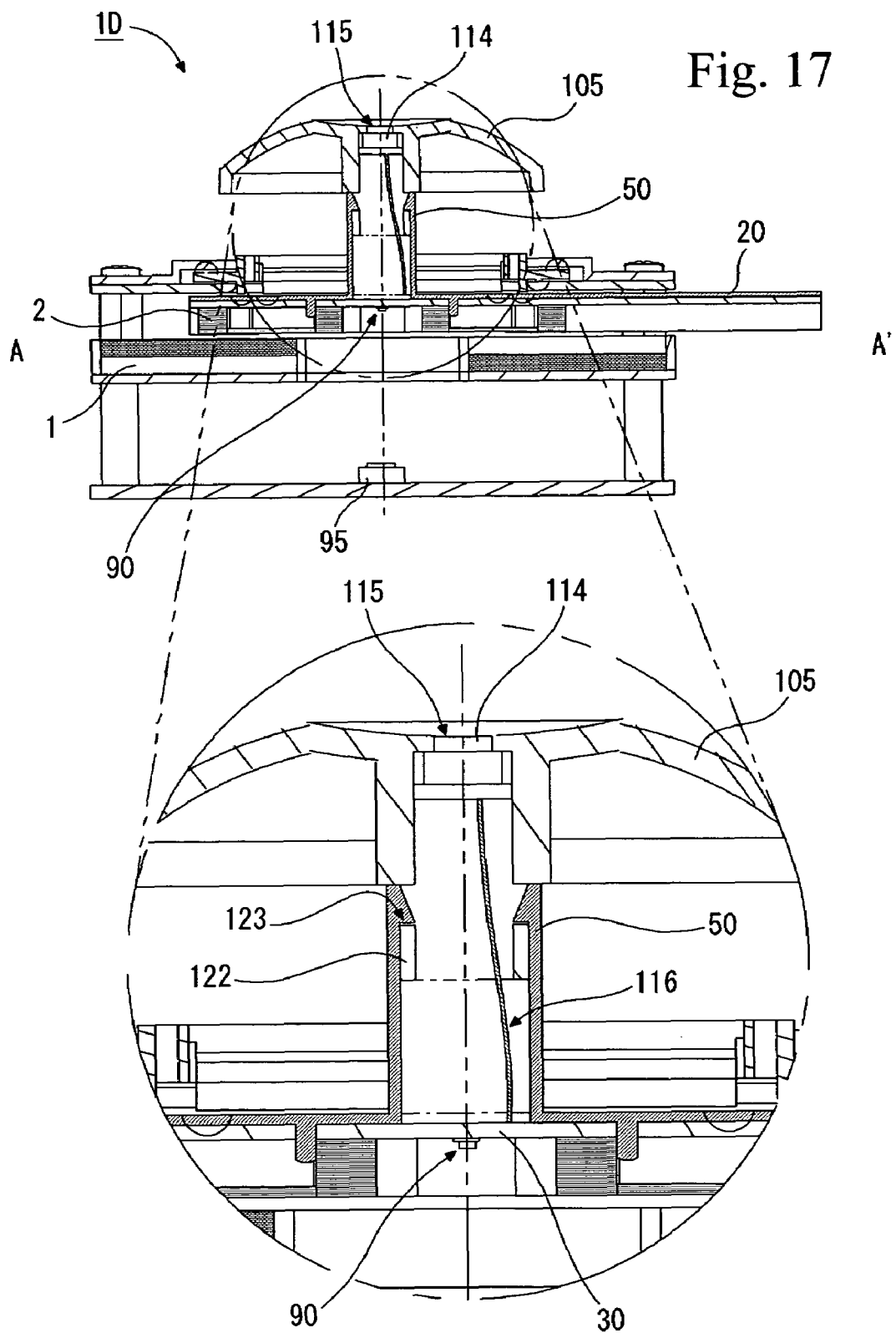
FIG. 17 is a section view of an input device in accordance with a third embodiment of the present invention, taken along the same line as the line A–A' of FIG. 5A.

Referring now to FIG. 17, a third embodiment of the present invention will be described in detail. In FIG. 17, the same components as those of the foregoing embodiments are denoted by the same reference numerals as those in the foregoing drawings, and explanation of them will not be repeated in the following description. In the second embodiment, only the mechanical button switch 111 is used for the switch mechanism. In this embodiment, on the other hand, only the photointerrupter 114 is used for the switch mechanism, so as to simplify the entire structure of the input device.

FIG. 17 is a section view of an input device 1D in accordance with this embodiment, taken along the same line as the line A–A' of FIG. 5A. As shown in FIG. 17, the switch mechanism of the input device 1D is formed by the photointerrupter 114 that is embedded in the center of the key top 105 so as to face operators in the same manner as in the first embodiment. This photointerrupter 114 may be of a light reflector type, for example, and switches on and off when covered with a hand or finger of an operator to reflect light emitted from a LED (light emitting diode) and to send the reflected light to a phototransistor. The photointerrupter 114 is connected to the circuit board 30 with a lead wire such as the jumper lead 116 that is led into the key top 105 and the mobile piece 50. The photointerrupter 114 is covered with the window 115 made of glass, transparent plastic, or quartz. The other aspects of the structure of this embodiment are the same as those of the first embodiment, and therefore, explanation of them is omitted herein.

In the above manner, it is possible to form a switch mechanism having only an optical structure. With such a switch mechanism, the entire structure can be simplified, and an input device can be readily manufactured at lower production costs.

FOURTH EMBODIMENT

Figure 18:
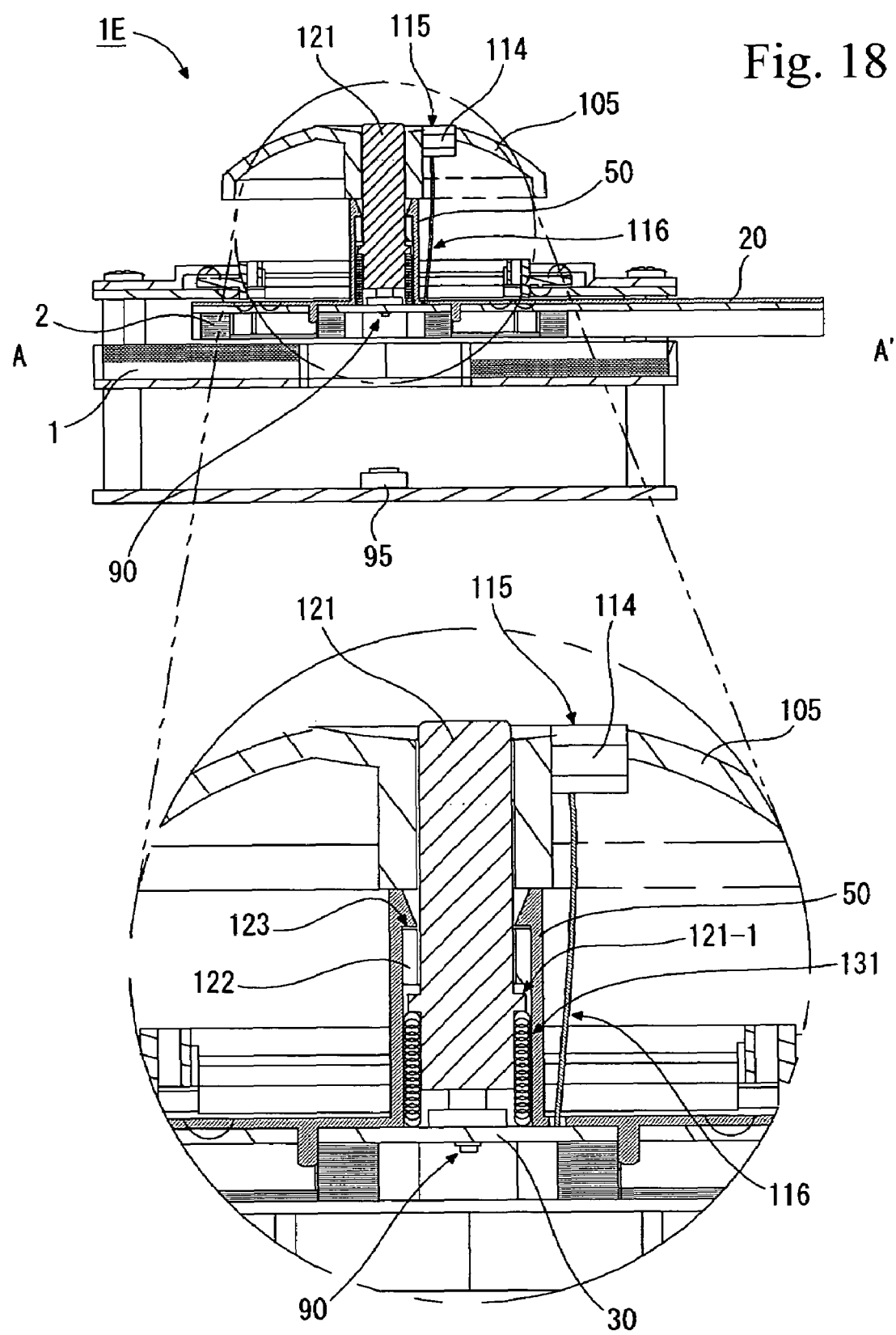
FIG. 18 is a section view of an input device in accordance with a fourth embodiment of the present invention, taken along the same line as the line A–A' of FIG. 5A.

Referring now to FIG. 18, a fourth embodiment of the present invention will be described in detail. In FIG. 18, the same components as those of the foregoing embodiments are denoted by the same reference numerals as those in the foregoing drawings, and explanation of them will not be repeated in the following description. This embodiment represents another case where both a mechanical switch and an optical switch are employed for the switch mechanism, as in the first embodiment.

FIG. 18 is a section view of an input device 1E in accordance with this embodiment, taken along the same line as the line A–A' of FIG. 5A. As shown in FIG. 18, the switch mechanism of the input device 1E includes the button switch 111 and the photointerrupter 114. The button switch 111 is connected to the circuit board 30 at the bottom of the mobile piece 50, and the pressing member 121 is provided on the button switch 111. The photointerrupter 114 is embedded in a region that faces operators and is adjacent to the pressing member 121 protruding from the key top 105.

The pressing member 121 penetrates the key top 105 and the opening 51 (see FIGS. 4A and 5A) formed through the upper part of the mobile piece 50, and protrudes from the upper surface of the key top 105. The key top 105 is secured onto the upper part of the mobile piece 50. Accordingly, when an operator presses the pressing member 121 protruding from the key top 105, the button switch 111 located immediately below the pressing member 121 is switched on and off. The claws 123 are further formed on the inner wall of the opening 51, and the packing members 122 of the shape matching the shape of the opening 51 are engaged with the claws 123. The ring-like convex part 121-1 is supported by springs 131 that are fixed to the mobile piece 50 (or the slider 20) at one side. Accordingly, the furthest point the pressing member 121 can go down is the point at which the packing 122 is brought into contact with the ring-like convex part 121-1 formed on the pressing member 121 inside the mobile piece 50, and a force to return to the original position is applied to the pressing member 121 after pressing.

This photointerrupter 114 may be of a light reflector type, for example, and switches on and off when covered with a hand or finger of an operator so as to reflect light emitted from a LED (light emitting diode) and to send the reflected light to a phototransistor. The photointerrupter 114 is connected to the circuit board 30 with a lead wire such as the jumper lead 116 that is led into the key top 105 and the mobile piece 50. The photointerrupter 114 is covered with the window 115 made of glass, transparent plastic, or quartz.

In this manner, it is possible to combine a mechanical switch with an optical switch so as to form a different structure from the structure of the first embodiment. This combination switch mechanism can also be incorporated into an input device. The other aspects of this embodiment are the same as the corresponding aspects of the first embodiment, and therefore, explanation of them is omitted herein.

FIFTH EMBODIMENT

Figure 19:
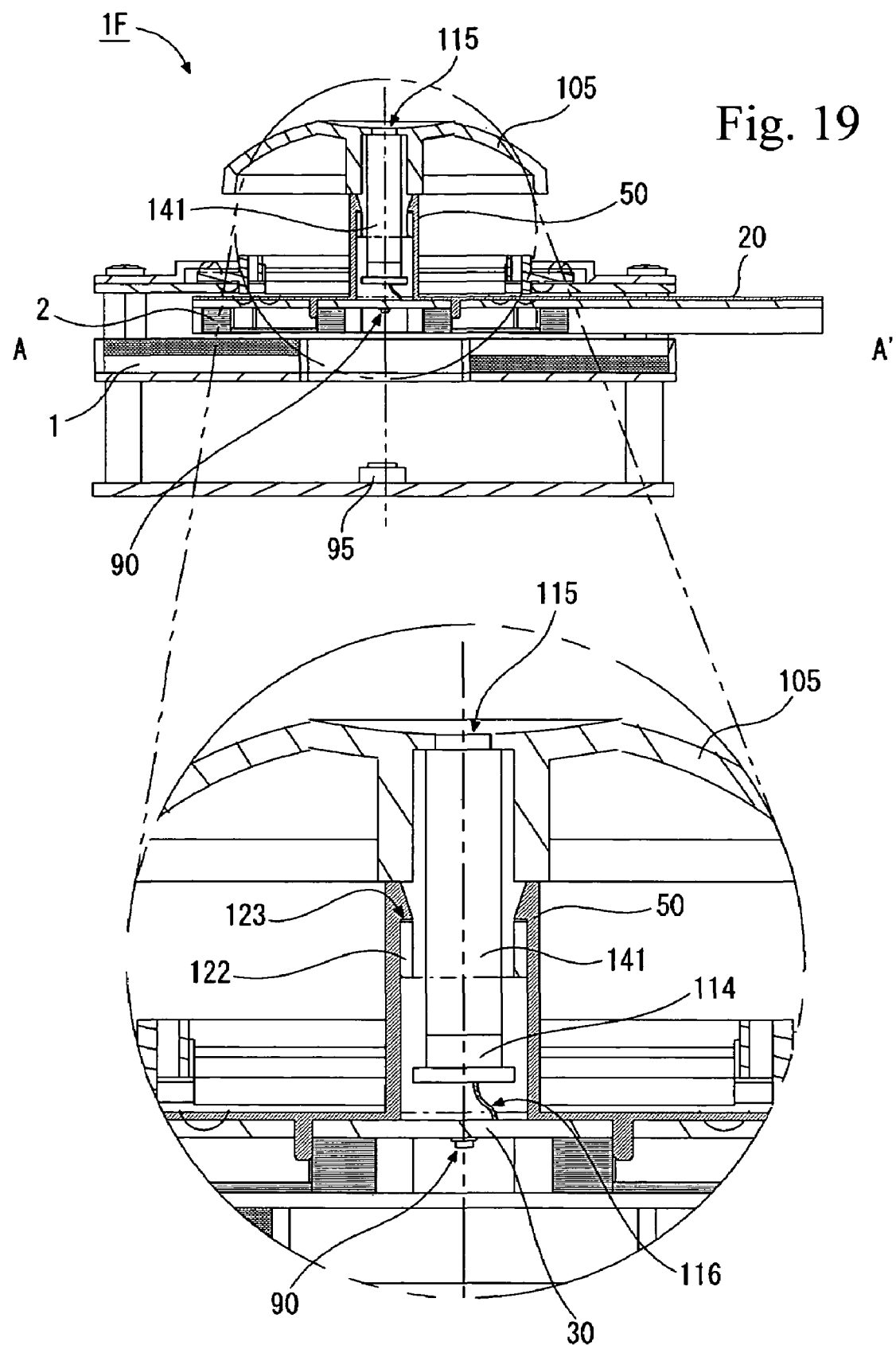
FIG. 19 is a section view of an input device in accordance with a fifth embodiment of the present invention, taken along the same line as the line A–A' of FIG. 5A.

Referring now to FIG. 19, a fifth embodiment of the present invention will be described in detail. In FIG. 19, the same components as those of the foregoing embodiments are denoted by the same reference numerals as those in the foregoing drawings, and explanation of them will not be repeated in the following description. This embodiment represents another case where only an optical switch is employed for the switch mechanism, as in the third embodiment.

FIG. 19 is a section view of an input device 1F in accordance with this embodiment, taken along the same line as the line A–A' of FIG. 5A. As shown in FIG. 19, the switch mechanism of the input device 1F is formed by the photointerrupter 114 that is located in the vicinity of the circuit board 30 inside the mobile piece 50. In this arrangement, the wire (the jumper lead 116) connecting the photointerrupter 114 to the circuit board 30 can be shortened. The photointerrupter 114 may be of a light reflector type, for example, and switches on and off when covered with a hand or finger of an operator to reflect light emitted from a LED (light emitting diode) and to send the reflected light to a phototransistor. In this structure having the photointerrupter 114 embedded deep in the mobile mechanism (including the key top 105, the mobile piece 50, and the slider 20), however, there exists a long distance between the reflection surface (or the window 115 provided in the key top 105) of the photointerrupter 114 and the detection surface (or the light incident surface) of the photointerrupter 114. So as to reduce optical loss between the window 115 to serve as the reflection surface and the upper surface (the light incident surface) of the photointerrupter 114 to serve as the detection surface, an optical waveguide pipe 141 formed by optical fibers or the likes is provided in between, as shown in FIG. 19. With the optical waveguide pipe 141, the optical loss caused between the reflection surface and the detection surface can be reduced. The other aspects of this embodiment are the same as those of the first embodiment, and therefore, explanation of them is omitted herein.

As described above, in a case where an optical switch is employed for the switch mechanism, the optical waveguide pipe located between the reflection surface and the detection surface can reduce loss of light to be utilized in detecting operations.

SIXTH EMBODIMENT

Referring now to FIGS. 20A through 20C, a sixth embodiment of the present invention will be described in detail. In FIGS. 20A through 20C, the same components as those of the foregoing embodiments are denoted by the same reference numerals as those in the foregoing drawings, and explanation of them will not be repeated in the following description.

FIGS. 20A through 20C illustrate an input device 1G in accordance with this embodiment. More specifically, FIG. 20A is a plan view, FIG. 20B is a front view, and FIG. 20C is a side view of the input device 1G. As shown in FIGS. 20A through 20C, the input device 1G has a base 19 in which the magnets 1 and the spacers 11-1 described in First Embodiment are molded from a magnetic material. In this embodiment, the number of components is reduced accordingly, and the manufacturing process can be simplified. The other aspects of this embodiment are the same as those of the first embodiment, and therefore, explanation of them is omitted herein.

SEVENTH EMBODIMENT

Referring now to FIGS. 21A through 21C, a seventh embodiment of the present invention will be described in detail. In FIGS. 21A through 21C, the same components as those of the foregoing embodiments are denoted by the same reference numerals as those in the foregoing drawings, and explanation of them will not be repeated in the following description.

FIGS. 21A through 21C illustrate an input device 1H in accordance with this embodiment. More specifically, FIG. 21A is a plan view, FIG. 21B is a front view, and FIG. 21C is a side view of the input device 1H. So as to prevent diffused reflection of light inside the input device 1H, coils 21 covered with a black color agent are employed in place of the coils 2, as shown in FIGS. 21B and 21C. With the coils 21 that are black in appearance, it is possible to control diffused reflection of light entering through the window 115 and light emitted from the LED of the photointerrupter 114 and the LED 90. Accordingly, this input device 1H can be incorporated into an optical mouse or the like, without decrease of precision and sensitivity in mouse location detection. The blackening process carried out on the magnets 1 further enhances the above effect. In the blackening process, epoxy resin or the like containing a black color agent is applied to magnets. The other aspects of this embodiment are the same as those of the first embodiment, and therefore, explanation of them is omitted herein.

EIGHTH EMBODIMENT

Figure 22:
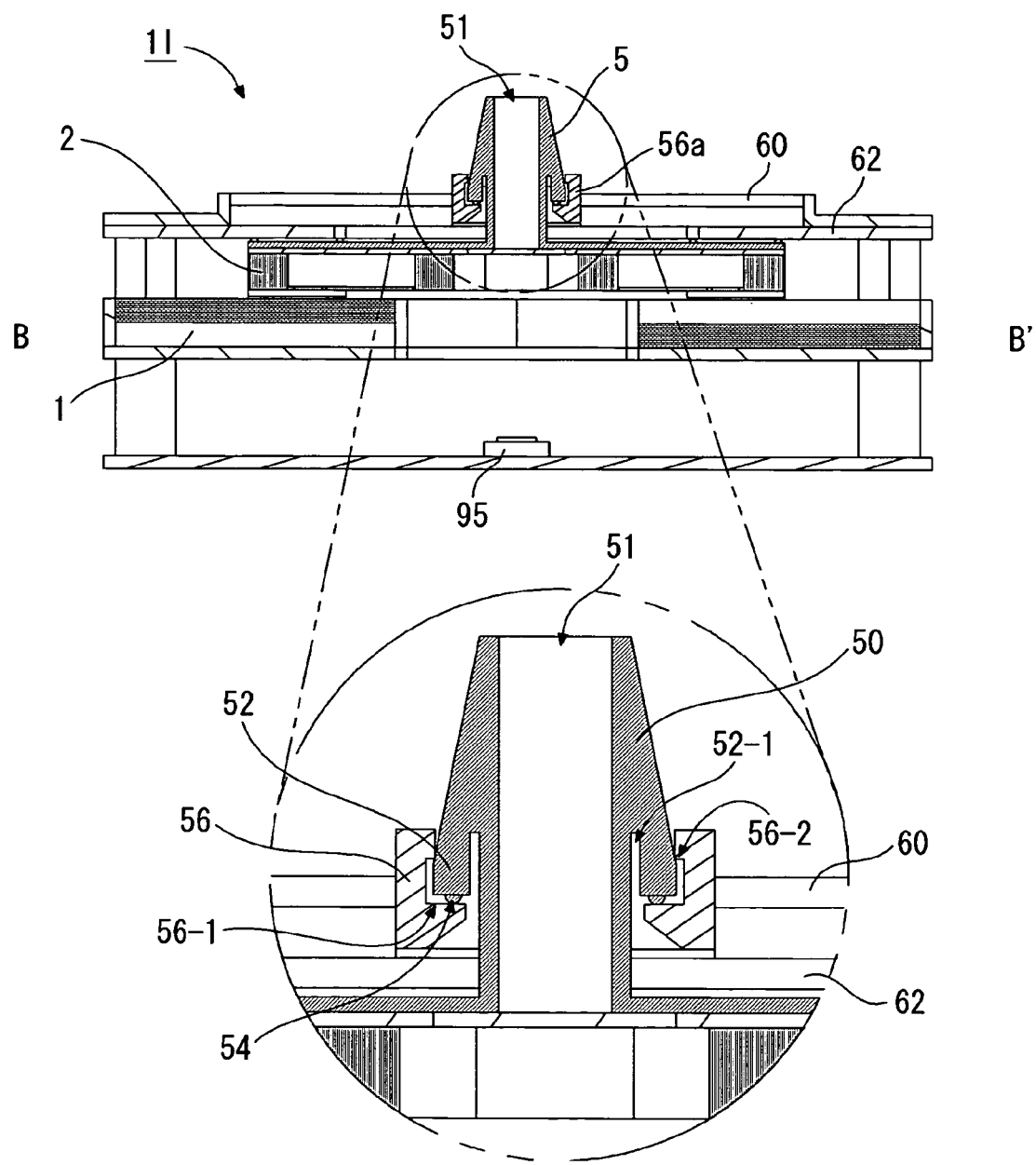
FIG. 22 is a section view of an input device in accordance with an eighth embodiment of the present invention, taken along the same line as the line B–B' of FIG. 5A.

Referring now to FIG. 22, an eighth embodiment of the present invention will be described in detail. In FIG. 22, the same components as those of the foregoing embodiments are denoted by the same reference numerals as those in the foregoing drawings, and explanation of them will not be repeated in the following description.

FIG. 22 is a section view of an input device 1I in accordance with this embodiment, taken along the same line as the line B–B' of FIG. 5A. As shown in FIG. 22, the engaging tongues 52 of the mobile piece 50 each has a notch 52-1, and the first guide member 56 has engaging claws 56-2 to be engaged with the engaging tongues 52 of the mobile piece 50 in this embodiment. When the mobile piece 50 is positioned to the first guide member 56 and is pressed down in the assembling process, the engaging tongues 52 are elastically deformed, and are then restored to the original state after sliding through the first guide member 56. Accordingly, the mobile piece 50 can be secured in the engaging state shown in FIG. 22. In this structure, the engaging tongues 52 serve as stoppers that prevent the first guide member 56 from slipping off, so that the assembling process can be carried out with high efficiency. As the engaging tongues 52 are engaged with the first guide member 56, the mobile piece 50, and the slider 20 and the coils 2 connected to the lower part of the mobile piece 50, can also be secured. The other aspects of this embodiment are the same as those of the first embodiment, and therefore, explanation of them is omitted herein.

NINTH EMBODIMENT

Figure 23:
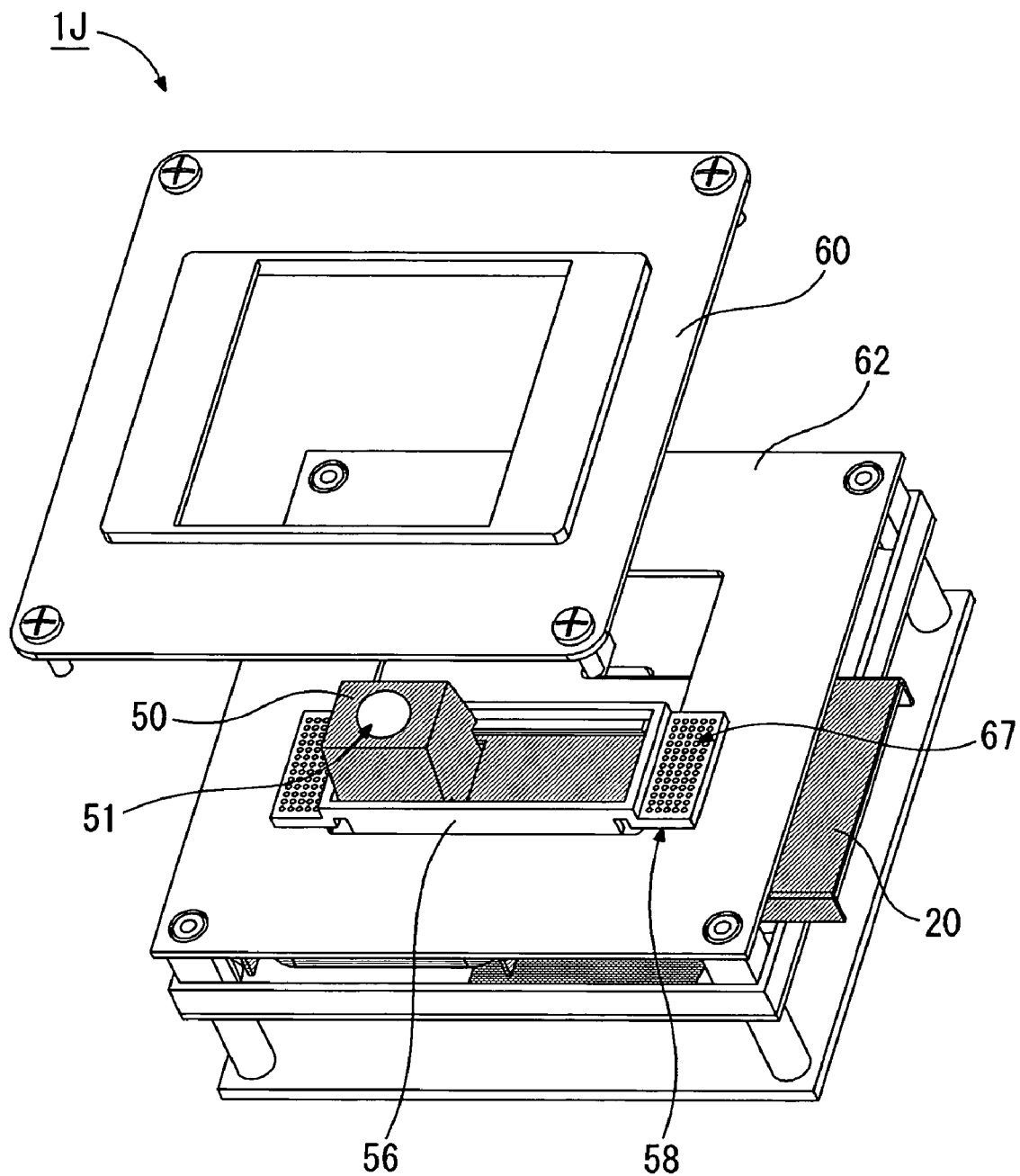
FIG. 23 is an exploded perspective view of an input device in accordance with a ninth embodiment of the present invention.

Referring now to FIG. 23, a ninth embodiment of the present invention will be described in detail. In FIG. 23, the same components as those of the foregoing embodiments are denoted by the same reference numerals as those in the foregoing drawings, and explanation of them will not be repeated in the following description.

FIG. 23 is an exploded perspective view of an input device 1J in accordance with this embodiment. As shown in FIG. 23, the input device 1J has concavities 67 instead of the protrusions formed on the end parts 58 of the first guide member 56. In this embodiment, the concavities 67 are formed on the upper surfaces of the end parts 58. With these concavities 67, the friction between the first guide member 56 and the upper guide plate 60 is reduced, so that the first guide member 56 can be moved smoothly. It is more preferable to form the concavities 67 also on the lower surfaces of the end parts 58 so as to minimize the friction between the first guide member 56 and the lower guide plate 62. The concavities 67 may also be formed on the upper guide plate 60 and/or the lower guide plate 62. The other aspects of this embodiment are the same as those of the first embodiment, and therefore, explanation of them is omitted herein.

TENTH EMBODIMENT

Figure 24A:
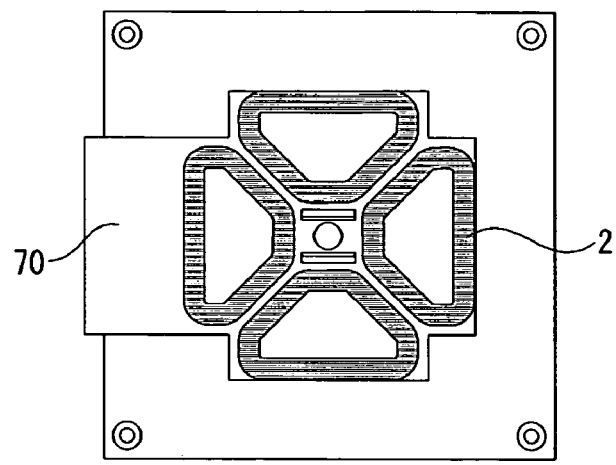
FIG. 24A illustrates a structure in which the circuit board is integrally formed with the slider in accordance with a tenth embodiment of the present invention.
Figure 24B:
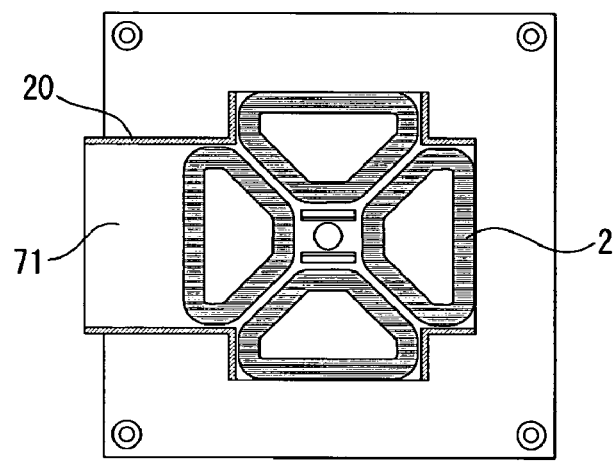
FIG. 24B illustrates a structure in which the coils are bonded to the circuit board in accordance with the tenth embodiment.
Figure 24C:
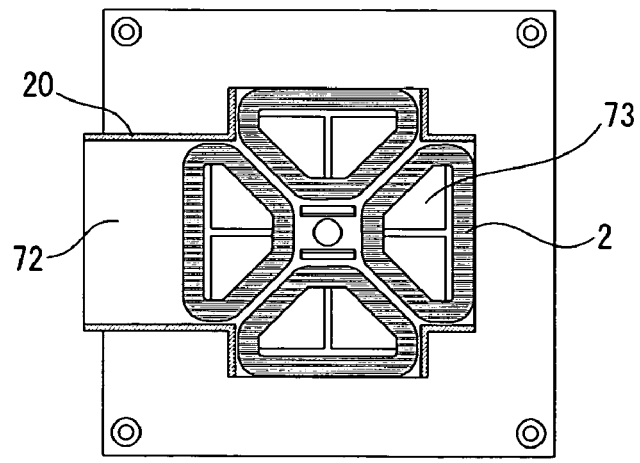
FIG. 24C illustrates another structure in which the coils are bonded to the circuit board in accordance with the tenth embodiment.

Referring now to FIGS. 24A through 24C, a tenth embodiment of the present invention will be described in detail. In FIGS. 24A through 24C, the same components as those of the foregoing embodiments are denoted by the same reference numerals as those in the foregoing drawings, and explanation of them will not be repeated in the following description. This embodiment provides example structures in which modifications of the circuit board 30 having the coils 2 (or the magnets 1) fixed thereto are employed, and three such example structures will be described below.

FIG. 24A illustrates a first example structure in which a circuit board 70 is integrally formed with the slider 20. In this example, the coils 2 are simply bonded to the circuit board 70, so that the production costs can be lowered and the efficiency in the manufacturing process can be increased. FIG. 24B illustrates a second example structure in which the coils 2 are bonded to a circuit board 71. In this example, the coils 2 are bonded to the circuit board 71, and the wires are drawn into the circuit board 71. Accordingly, the production costs can be lowered, and the efficiency in the manufacturing process can be increased. FIG. 24C illustrates a third example structure in which the coils 2 are bonded to a circuit board 72. In this example, the coils 2 are bonded to the circuit board 72, and ribs 73 for securing coils are bonded into holes formed in the circuit substrate 72. Accordingly, the coils 2 can be more firmly secured to the circuit board 72. The other aspects of this embodiment are the same as those of the first embodiment, and therefore, explanation of them is omitted herein.

ELEVENTH EMBODIMENT

Referring now to FIGS. 25A through 25D, an eleventh embodiment of the present invention will be described in detail. In FIGS. 25A through 25D, the same components as those of the foregoing embodiments are denoted by the same reference numerals as those in the foregoing drawings, and explanation of them will not be repeated in the following description. This embodiment provides example structures in which the impact force and impact noise are controlled when the mobile piece 50 reaches an end of the sliding range. FIGS. 25A through 25D illustrate four specific examples of such structures.

Figure 25A:
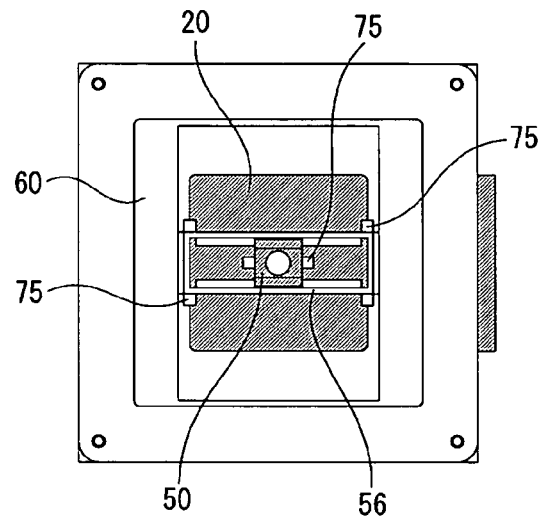
FIGS. 25A through 25D illustrate example structures in which impact force and impact noise are controlled when the mobile piece reaches an end of the sliding range in accordance with an eleventh embodiment of the present invention.
Figure 25B:
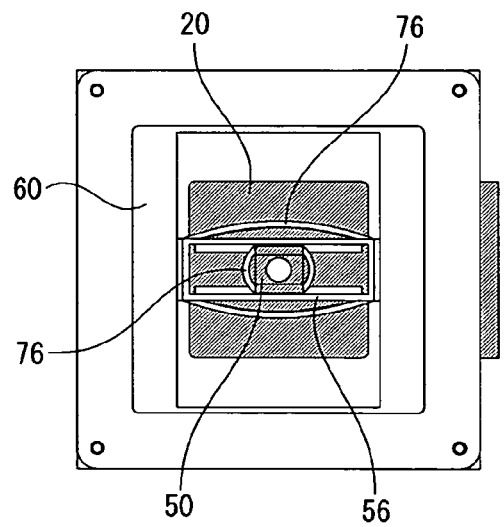
Figure 25C:
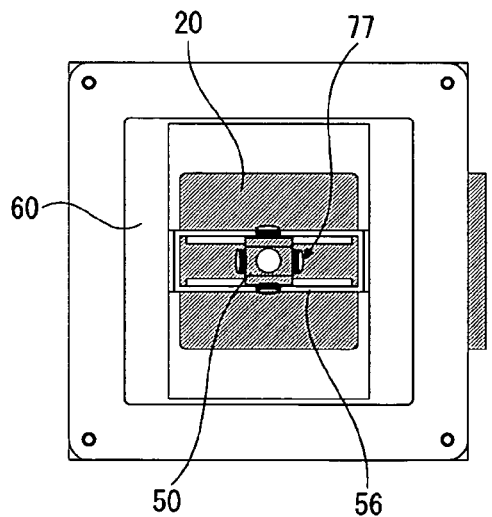
Figure 25D:
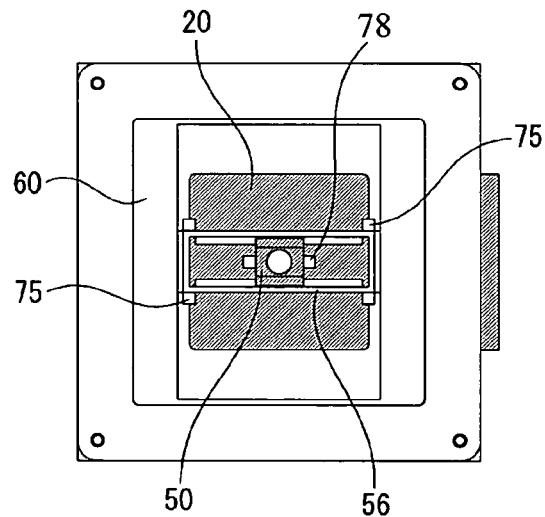

FIG. 25A shows a first example structure in which protrusions 75 are employed so as to reduce the collision area in the guiding direction of the mobile piece 50 and the guiding direction of the first guide member 56. In this example, the protrusions 75 can be easily formed when the mobile piece 50 and the first guide member 56 are molded. However, it is preferable to employ a material that can be elastically deformed for the collision parts (i.e., the protrusions 75, the first guide member 56, and the second guide member 61). FIG. 25B shows a second example structure in which plate springs 76 are employed as elastic members. FIG. 25C shows a third example structure in which coil springs 77 are employed as elastic members. FIG. 25D shows a fourth example structure in which shock absorption members 78 made of rubber or sponge are employed as elastic members. With the shock absorption members 78, the shock caused at the time of collision can be relieved, and the impact noise can be reduced or even eliminated. The other aspects of this embodiment are the same as those of the first embodiment, and therefore, explanation of them is omitted herein.

TWELFTH EMBODIMENT

Figure 26A:
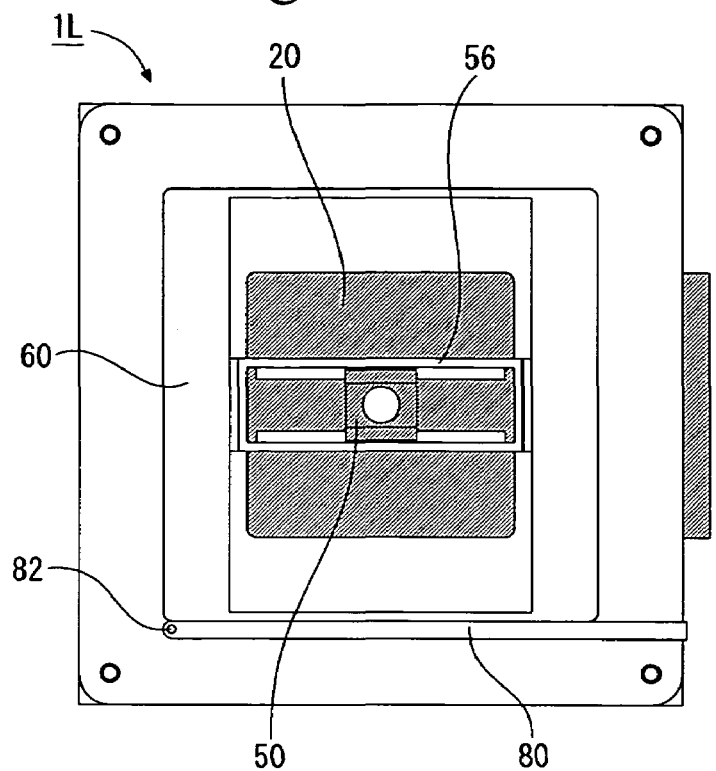
FIG. 26A is a plan view of an input device when it is being used in accordance with a twelfth embodiment of the present invention.
Figure 26B:
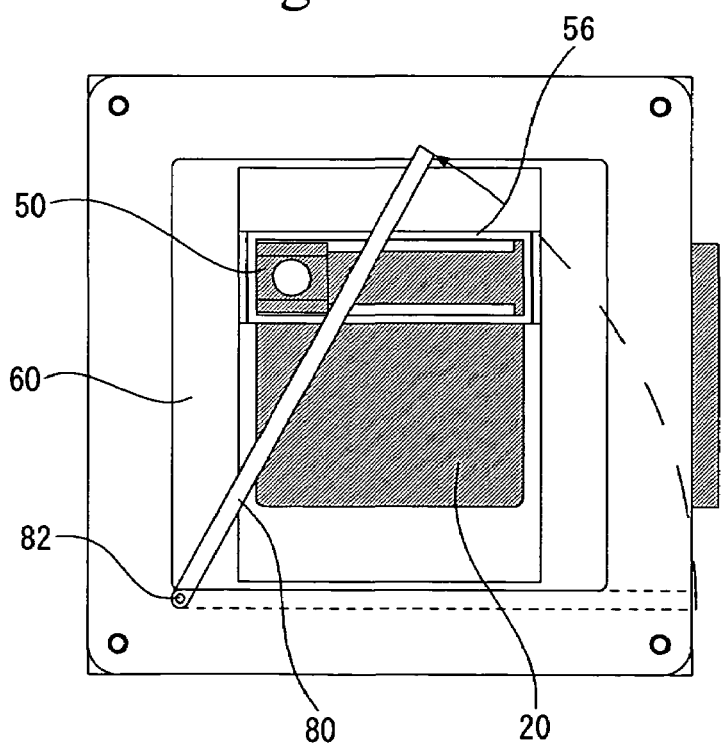
FIG. 26B is a plan view of the input device when it is not being used in accordance with the twelfth embodiment.

Referring now to FIGS. 26A and 26B, a twelfth embodiment of the present invention will be described in detail. In FIGS. 26A and 26B, the same components as those of the foregoing embodiments are denoted by the same reference numerals as those in the foregoing drawings, and explanation of them will not be repeated in the following description. This embodiment provides an input device 1L equipped with a mechanism that is on standby when the input device 1L is not being used.

FIG. 26A is a plan view of the input device 1L when it is being used, and FIG. 26B is a plan view of the input device 1L when it is not being used. This input device 1L has a stick member 80 that can rotate on a rotation axis 82. This stick member 80 can be retracted to such a position as not to hinder operations when the input device 1L (especially the actuator part) is not being used, as shown in FIG. 26A. On the other hand, when the input device 1L is not being used, the stick member 80 rotates on the rotation axis 82, and is pressed and secured to a predetermined spot, such as the upper left end of the mobile piece 50. With this mechanism, the mobile piece 50 and the slider 20 connected to the mobile piece 50 can be secured in predetermined positions when the input device 1L is not being used. The other aspects of this embodiment are the same as those of the first embodiment, and therefore, explanation of them is omitted herein.

THIRTEENTH EMBODIMENT

Referring now to FIGS. 27A through 27D, a thirteenth embodiment of the present invention will be described in detail. In FIGS. 27A through 27D, the same components as those of the foregoing embodiments are denoted by the same reference numerals as those in the foregoing drawings, and explanation of them will not be repeated in the following description.

In the foregoing embodiments, the LED 90 and the PD 95 are employed to detect the locations of the coils 2. In this embodiment, on the other hand, Hall elements that are magneto-electric conversion elements are employed.

Figure 27A:
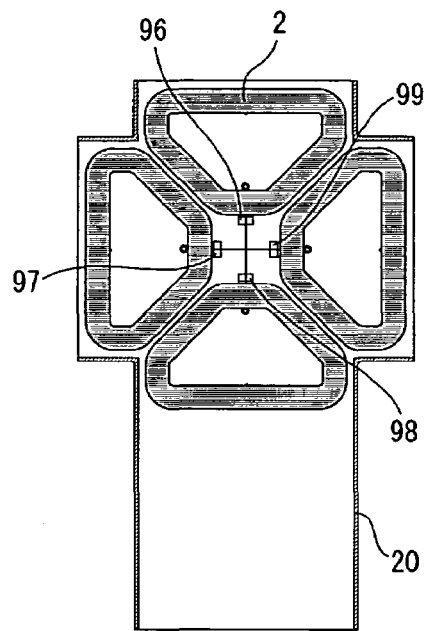
FIG. 27A is a bottom view of the slider of an input device in accordance with a thirteenth embodiment of the present invention.
Figure 27B:
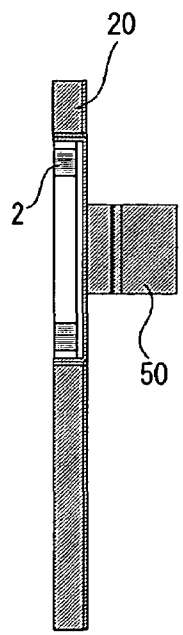
FIG. 27B is a side view of the slider of the input device in accordance with the thirteenth embodiment.
Figure 27C:
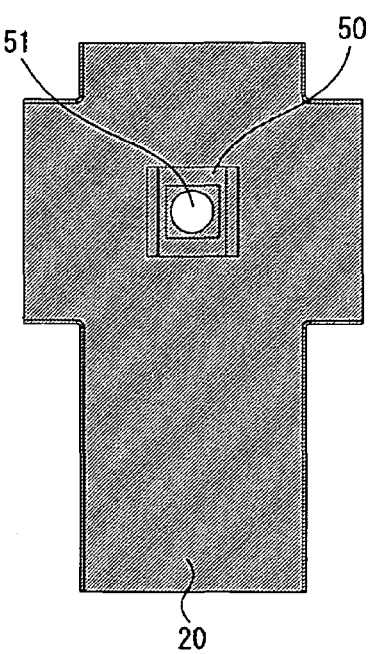
FIG. 27C is a top view of the slider of the input device in accordance with the thirteenth embodiment.
Figure 27D:
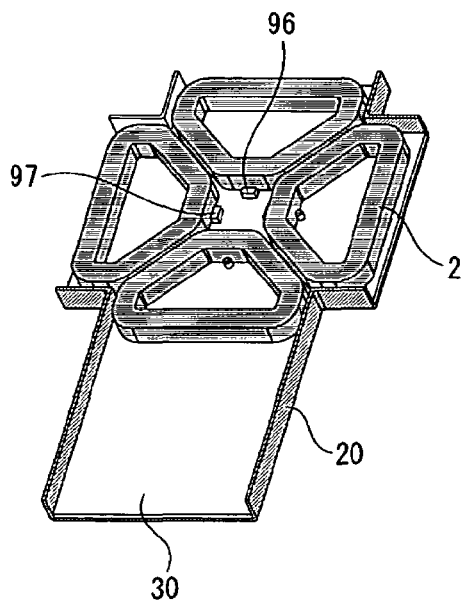
FIG. 27D is a perspective view of the slider of the input device in accordance with the thirteenth embodiment.

FIGS. 27A through 27D illustrate the slider 20 in accordance with this embodiment. More specifically, FIG. 27A is a bottom view, FIG. 27B is a side view, FIG. 27C is a top view, and FIG. 27D is a perspective view of the slider 20. As shown in FIGS. 27A and 27D, four Hall elements 96 through 99 are attached to the four coils 2. The Hall elements 96 and 98 are arranged on the line extending in the longitudinal direction of the slider 20. The Hall elements 97 and 99 are arranged on the line that is perpendicular to the longitudinal direction line. Accordingly, the Hall elements 96 through 99 are arranged so as to be in line with the moving directions of the mobile piece 50.

Although not shown in FIGS. 27A through 27D, the coils 2 also face the magnets 1 as in the foregoing embodiments. When the slider 20 is moved in relation to the magnets 1, a voltage in accordance with the movement is detected from the Hall elements 96 through 99. Thus, the locations of the mobile piece 50 and the coils 2 can be detected as in the foregoing embodiments.

Figure 28A:
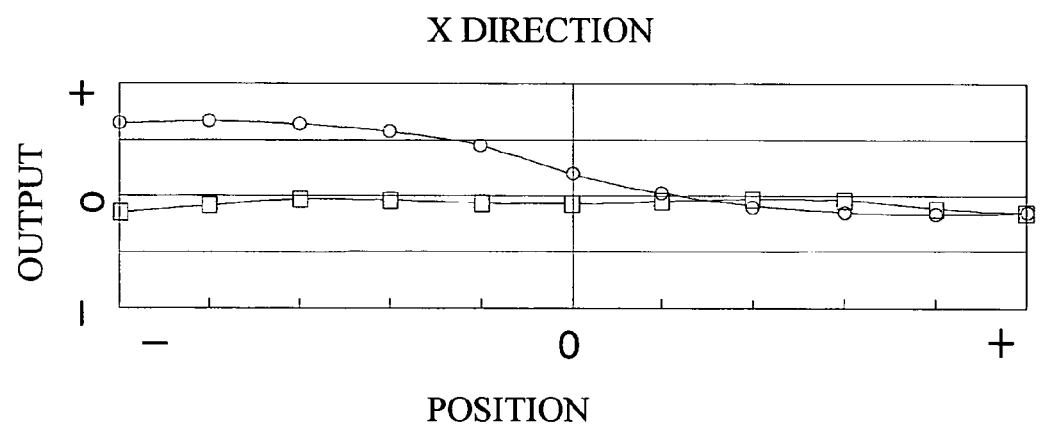
FIG. 28A shows outputs in a case where the mobile piece is moved in the X-direction in accordance with the thirteenth embodiment.
Figure 28B:
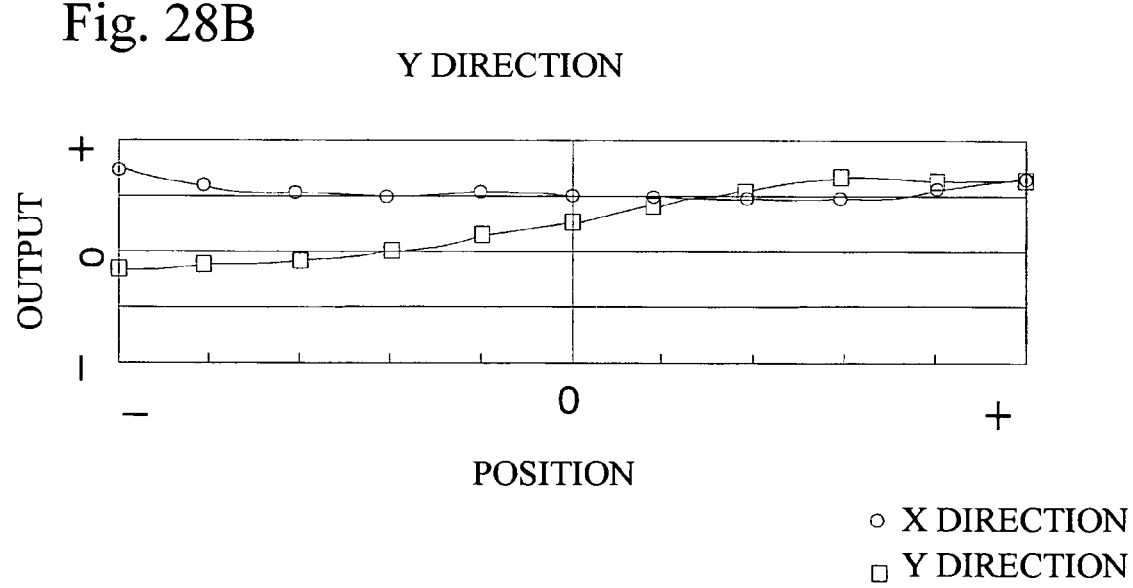
FIG. 28B shows outputs in a case where the mobile piece is moved in the Y-direction.

FIGS. 28A and 28B show the relationship between movement of the mobile piece 50 and output in cases where the slider 20 of this embodiment is employed. FIG. 28A shows the outputs that were obtained when the mobile piece 50 was moved in the X-direction (the direction of the Hall elements 97 and 99). FIG. 28B shows the outputs that were obtained when the mobile piece 50 was moved in the Y-direction (the direction of the Hall elements 96 and 98). As is apparent from FIGS. 28A and 28B, the Hall elements 96 through 99 are effective in the detection of the locations of the mobile 50 and the coils 2. Instead of the Hall elements 96 through 99, magneto-resistive devices may be employed. The other aspects of this embodiment are the same as those of the first embediment, and therefore, explanation of them is omitted herein.

FOURTEENTH EMBODIMENT

Figure 29:
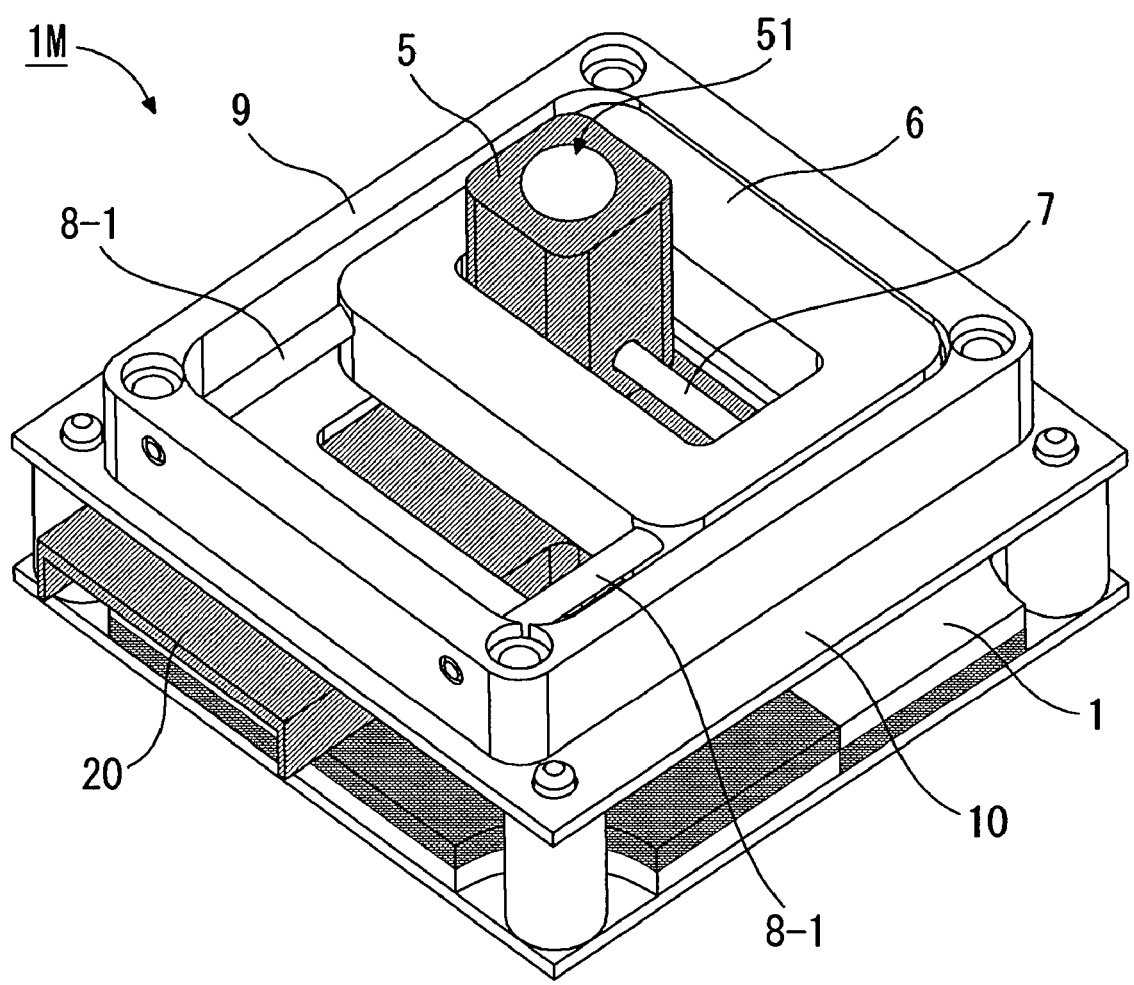
FIG. 29 is a perspective view of an input device in accordance with a fourteenth embodiment of the present invention.

Referring now to FIG. 29 and FIGS. 30A through 30C, a fourteenth embodiment of the present invention will be described in detail. In FIG. 29, the same components as those of the foregoing embodiments are denoted by the same reference numerals as those in the foregoing drawings, and explanation of them will not be repeated in the following description. In each of the foregoing embodiments, engaging tongues and rails are combined to form a mobile mechanism. In this embodiment, on the other hand, a shaft is employed so as to realize a mobile mechanism.

Figure 30A:
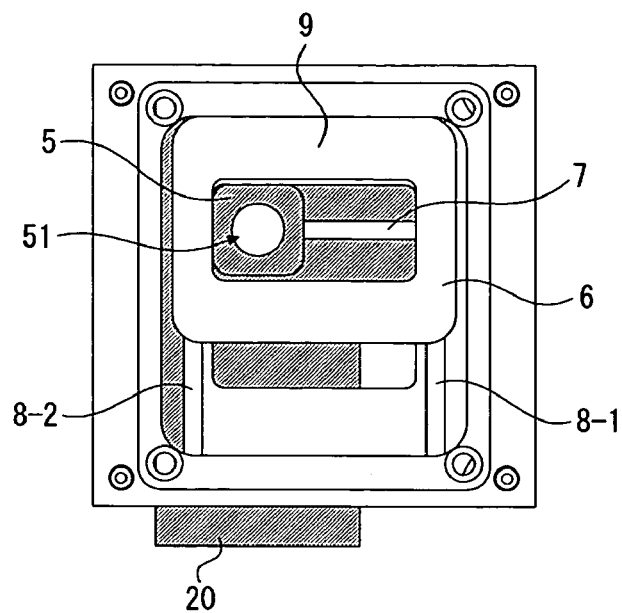
FIG. 30A is a plan view of the input device in accordance with the fourteenth embodiment.
Figure 30B:
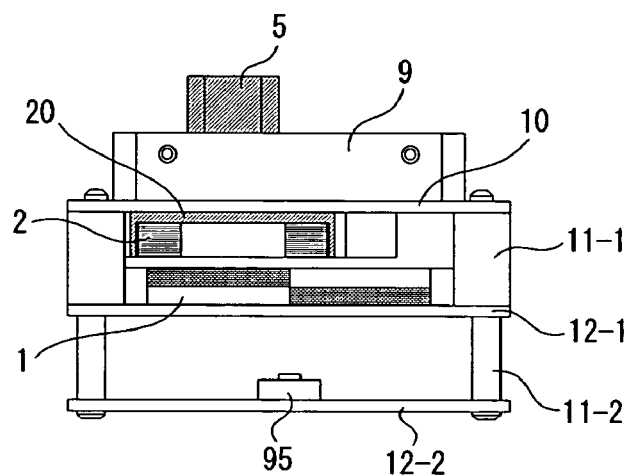
FIG. 30B is a front view of the input device in accordance with the fourteenth embodiment.
Figure 30C:
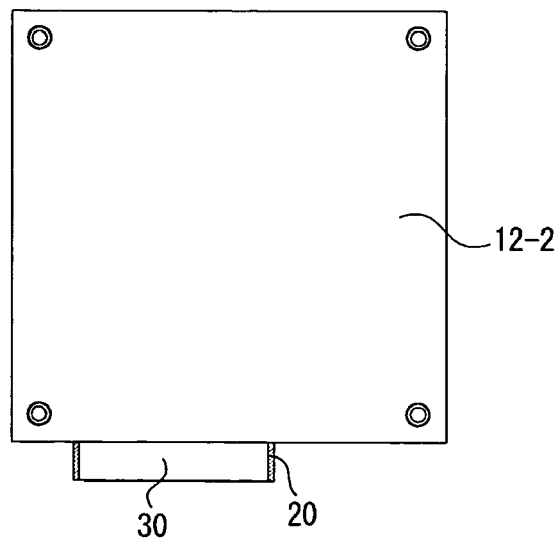
FIG. 30C is a bottom view of the input device in accordance with the fourteenth embodiment.

FIG. 29 and FIGS. 30A through 30C illustrate an input device 1M in accordance with this embodiment. More specifically, FIG. 29 is a perspective view of the input device 1M, FIG. 30A is a plan view of the input device 1M, FIG. 30B is a side view of the input device 1M, and FIG. 30C is a bottom view of the input device 1M.

Like the input device 1A in accordance with the first embodiment, the input device 1M in accordance with this embodiment has an actuator part that includes the magnets 1 and the coils 2 formed on the bottom plate 12-1 (see FIG. 2A). The magnets 1 are flatly arranged on the bottom plate 12-1, with N-poles and S-poles alternating. The supporting plate 10 is placed over the bottom plate 12-1, with the spacers 11-1 being interposed between the supporting plate 10 and the bottom plate 12-1. A mobile mechanism for moving the coils 2 two-dimensionally is formed on the supporting plate 10, as already mentioned.

Although FIG. 29 only partially shows the slider 20, which is the mobile member in the mobile mechanism, the slider 20 is located above the magnets 1, as shown in FIG. 30B. The coils 2 are held by the lower surface of the slider 20. A mobile piece 5 protruding from the upper surface of the slider 20 sticks out of the input device 1M. The mobile piece 5 is deigned to move with the slider 20. The structure of the slider 20 of this embodiment is the same as the slider 20 shown in FIGS. 10A and 10B, and therefore, explanation of the slider 20 is omitted herein.

Referring back to FIG. 29, the mobile piece 5 is slidably held by a first holding member 6. A through hole is formed in the lower part of the mobile piece 5, and is engaged with a shaft 7 of the first holding member 6. The shaft 7 is secured to the inner surface of the ring-like first holding member 6. Thus, the mobile piece 5 is engaged with the first holding member 6. The first holding member 6 is also slidably held by a pair of shafts 8-1 and 8-2 arranged at a predetermined distance from each other in a second holding member 9.

In the above structure, the mobile piece 5 slides in one direction within the first holding member 6, and the first holding member 6 moves within the second holding member 9 in a direction perpendicular to the moving direction of the mobile piece 5. In this embodiment, when a predetermined thrust force is applied to the slider 20 to which the coils 2 are connected, the mobile piece 5 can be freely moved two-dimensionally, as in the first embodiment. The other aspects of this embodiment are the same as those of the first embodiment, and therefore, explanation of them is omitted herein.

OTHER EMBODIMENTS

Figure 31:
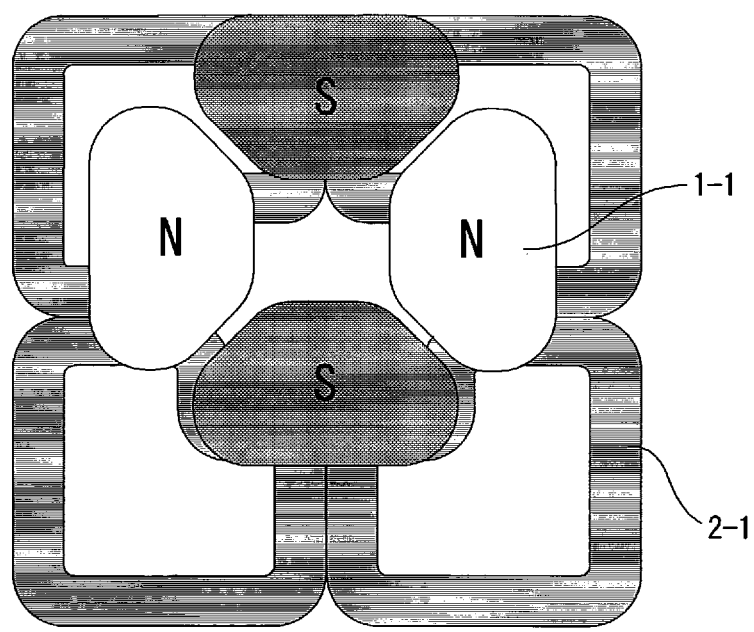
FIG. 31 illustrates a structure in which coils are secured while magnets are made mobile.
Figure 32:
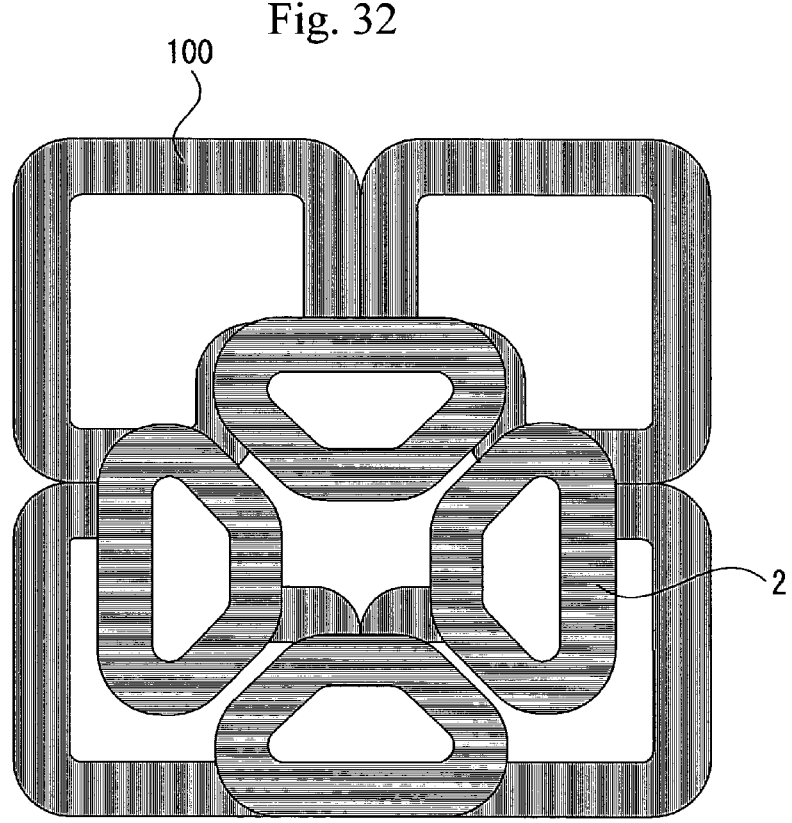
FIG. 32 illustrates a structure in which electromagnets are employed.

In each of the foregoing embodiments described so far, the magnets 1 are immobile while the coils 2 are mobile. In the present invention, however, it is also possible to move the magnets 1 while the coils 2 are secured. Referring now to FIGS. 31 and 32, the structure of an actuator part having immobile coils will be described.

As shown in FIG. 31, coils 2-1 in accordance with this embodiment have the same size as the magnets 1 of the first embodiment. Instead of the magnets 1, the coils 2-1 are secured onto the bottom plate 12-1. Magnets 1-1 have the same size as the coils of the first embodiment. Instead of the coils 2, the magnets 1-1 are secured to the bottom surface of the slider 20 (or onto the circuit board 30). Accordingly, when a driving current flows into the coils 2-1, the magnets 1-1 receive a force to move the slider 20 to which the magnets 1-1 are secured.

In each of the foregoing embodiments, permanent magnets that are manufactured by sintering are normally employed for the magnets 1 (or 1-1). However, the present invention is not limited to structures utilizing permanent magnets. Electromagnets 100 that are formed by winding coils, for example, may be employed as shown in FIG. 32.

Such a structure utilizing the electromagnets 100 has an advantage of not generating magnetism when the input device is not being used.

In each of the foregoing embodiments, the slider of an actuator is driven by supplying a current to the coils, or an actuator part is passively driven upon receipt of a signal from a computer or the like. However, the actuator part in accordance with the present invention is not limited to the above usage. For example, it is also possible to use the actuator part as a device to input instructions to a computer or the like, utilizing current generated within the coils due to electromagnetic induction when an operator touches the mobile piece with a finger to move the mobile piece. Accordingly, each actuator in accordance with the present invention is a novel actuator that can operate both passively and actively.

Figure 33:
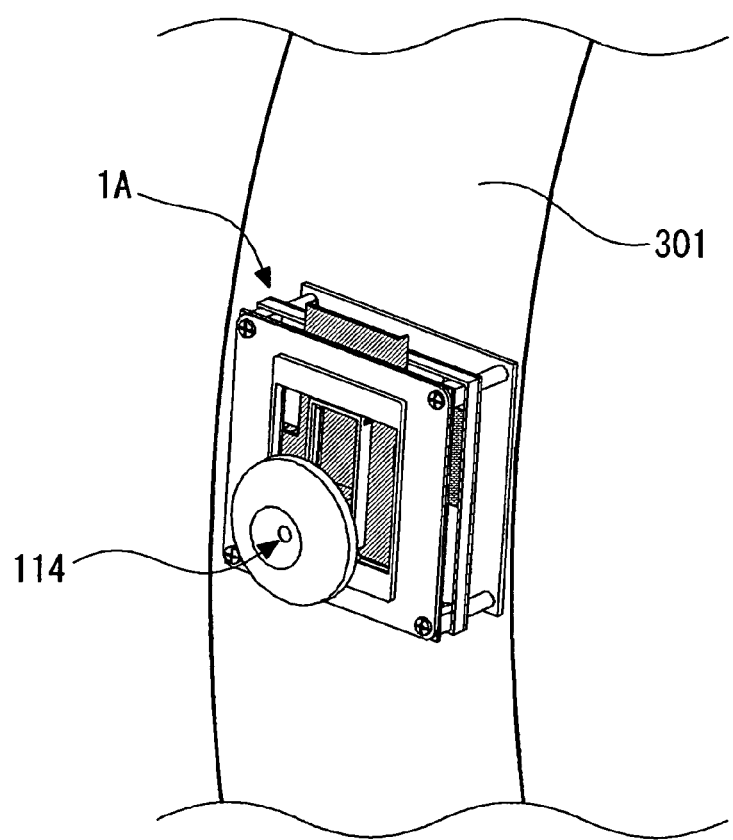
FIG. 33 illustrates a structure in which the input device in accordance with the first embodiment is incorporated into a steering wheel.

Each input device in accordance with the present invention can be incorporated not only into a mouse or the like, but also into a different device such as a steering system 301 for cars shown in FIG. 33, for example. With the input device 1A being incorporated into the steering system 301, various secondary advantages can be obtained since interactive information transmission can be achieved instead of the conventional one-directional information transmission. For example, a driver can operate an audio device, an air controller, or a navigation system, without turning his/her eyes away from the driving.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An input device comprising:
   magnets that are arranged in a flat state;
   coils that are arranged so as to face the magnets, and are moved in relation to the magnets;
   a mobile member that is connected to the coils;
   a first guide member that slidably guides the mobile member;
   a second guide member that slidably guides the first guide member in a direction perpendicular to the sliding direction of the mobile member; and
   a switch that is operated by an operator to carry out an input operation, the switch being formed on the mobile member.

2. The input device as claimed in claim 1, further comprising
   a controlling unit that performs control so as to allow control current to flow into the coils when the switch is on.

3. The input device as claimed in claim 1, further comprising
   a controlling unit that performs control so as to prohibit control current from flowing into the coils when the switch is on.

4. The input device as claimed in claim 1, wherein:
   the switch includes a button switch that is linked to the mobile member; and
   when the mobile member is pressed, the switch is turned on or off.

5. The input device as claimed in claim 1, further comprising
   a pressing member that is slidably located inside the mobile member and protrudes from the upper surface of the mobile member,
   wherein:
   the switch includes a button switch below the pressing member; and
   when the pressing member is pressed, the switch is turned on or off.

6. The input device as claimed in claim 1, wherein the switch includes a photointerrupter.

7. The input device as claimed in claim 6, wherein the photointerrupter is provided inside the mobile member so that a detection surface is exposed through the mobile member.

8. The input device as claimed in claim 6, further comprising
   an optical waveguide pipe that has one surface exposed through the mobile member and the other surface optically linked to a detection surface of the photointerrupter,
   wherein the photointerrupter is located inside the mobile member.

9. The input device as claimed in claim 1, wherein the switch includes a button switch and a photointerrupter, the button switch being linked to the lower part of the mobile member or being slidably provided inside the mobile member and protruding from the upper surface of the mobile member.

10. The input device as claimed in claim 1, wherein:
    the mobile member includes a mobile piece that protrudes so that an operator can touch the mobile member;
    the mobile piece includes an engaging tongue that engages with the first guide member so as to prevent the first guide member from slipping off.

11. The input device as claimed in claim 10, further comprising
    a stand-by mechanism that secures the mobile piece to a predetermined position.

12. The input device as claimed in claim 1, wherein at least one of the first guide member and the second guide member includes a protrusion on a sliding face.

13. The input device as claimed in claim 12, wherein the protrusion is a rail-like protrusion extending in a sliding direction.

14. The input device as claimed in claim 12, wherein the protrusion includes hemispherical protrusions scattered on the sliding face.

15. The input device as claimed in claim 1, wherein at least one of the first guide member and the second guide member includes a plurality of convex parts on a sliding face.

16. The input device as claimed in claim 1, wherein the mobile member includes a shock relief member that eases shock when the mobile member reaches the furthest end reachable.

17. The input device as claimed in claim 16, wherein the shock relief member includes at least one of a plate spring, a coil spring, or a shock absorber.

18. The input device as claimed in claim 1, wherein the magnets are integrally formed with spacers by molding a magnetic material.

19. The input device as claimed in claim 1, further comprising
    a substrate to which the coils are secured,
    wherein the substrate is secured by an engaging claw provided to the mobile member.

20. The input device as claimed in claim 19, wherein the substrate is integrally formed with the mobile member.

21. The input device as claimed in claim 1, further comprising
   a resin substrate to which the coils are secured,
   wherein the substrate has ribs for positioning and securing the coils.

22. The input device as claimed in claim 1, the coils are covered with a black color agent.

23. The input device as claimed in claim 1, wherein surfaces of the magnets are subjected to blackening.

24. The input device as claimed in claim 1, wherein epoxy resin containing a black color agent is applied to surfaces of the magnets.

25. The input device as claimed in claim 1, further comprising
   a magneto-electric conversion element that detects movement of the coils in relation to the magnets.

26. The input device as claimed in claim 1, wherein the magnets are permanent magnets or electromagnets.

27. The input device as claimed in claim 1, further comprising:
   a first substrate on which a driving unit for driving an actuator unit including the coils and the magnets is formed; and
   a second substrate on which a controlling unit for controlling the driving unit is formed,
   the first substrate and the second substrate being electrically connected to each other with a curled cable.

28. An input device comprising:
   coils that are arranged in a flat state;
   magnets that are arranged so as to face the coils, and are moved in relation to the coils;
   a mobile member that is connected to the magnets;
   a first guide member that slidably guides the mobile member; a second guide member that slidably guides the first guide member in a direction perpendicular to the sliding direction of the mobile member; and
   a switch that is operated by an operator to carry out an input operation,
   the switch being formed on the mobile member.

29. An input device comprising:
   magnets that are arranged in a flat state;
   coils that are arranged so as to face the magnets, and are moved in relation to the magnets;
   a mobile member that is connected to the coils;
   a first holding member that slidably holds the mobile member;
   a second holding member that slidably holds the first guide member in a direction perpendicular to the sliding direction of the mobile member; and
   a switch that is operated by an operator to carry out an input operation,
   the switch being formed on the mobile member.

30. The input device as claimed in claim 29, wherein the second holding member includes a pair of shafts that are arranged at a distance from each other and support the first holding member in a slidable state.

31. An input device comprising:
   coils that are arranged in a flat state;
   magnets that are arranged so as to face the coils, and are moved in relation to the coils;
   a mobile member that is connected to the magnets;
   a first holding member that slidably holds the mobile member;
   a second holding member that slidably holds the first guide member in a direction perpendicular to the sliding direction of the mobile member; and
   a switch that is operated by an operator to carry out an input operation,
   the switch being formed on the mobile member.

32. An input device comprising:
   a set of magnets and a set of coils one set arranged in a flat form and the other set facing the one set,
   a moving member connected to one of the set of magnets and the set of coils;
   a first member controlling the moving member to move within a predetermined range;
   a second member controlling the first member to move within another predetermined range in a second direction, perpendicular to the first direction; and
   a switch that is operated by an operator to carry out an input operation and is mounted on the moving member.

* * * * *